US006453314B1

United States Patent
Chan et al.

(10) Patent No.: US 6,453,314 B1
(45) Date of Patent: Sep. 17, 2002

(54) SYSTEM AND METHOD FOR SELECTIVE INCREMENTAL DEFERRED CONSTRAINT PROCESSING AFTER BULK LOADING DATA

(75) Inventors: Petrus Kai Chung Chan, Richmond Hill (CA); Roberta Jo Cochrane, Los Gatos, CA (US); Sam Sampson Lightstone, Toronto (CA); Mir Hamid Pirahesh, San Jose, CA (US); Richard Sefton Sidle, Mountain View, CA (US); Tuong Chanh Truong, San Jose, CA (US); Michael J. Winer, Markham; Calisto Paul Zuzarte, Pickering, both of (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,753

(22) Filed: Jul. 30, 1999

(51) Int. Cl.⁷ .............................................. G06F 17/30
(52) U.S. Cl. ............................ 707/3; 707/100; 707/201
(58) Field of Search ................................. 707/3, 4, 201, 707/100, 1, 2; 703/26; 717/2; 714/757

(56) References Cited

U.S. PATENT DOCUMENTS

| | | | |
|---|---|---|---|
| 4,933,848 A | 6/1990 | Haderle et al. | 707/201 |
| 5,133,068 A | 7/1992 | Crus et al. | 707/100 |
| 5,226,158 A | 7/1993 | Horn et al. | 707/201 |
| 5,386,557 A | 1/1995 | Boykin et al. | 707/1 |
| 5,513,350 A | 4/1996 | Griffin et al. | 717/2 |
| 5,577,231 A | 11/1996 | Scalzi et al. | 703/26 |
| 5,706,494 A | 1/1998 | Cochrane et al. | 707/2 |
| 5,745,896 A | 4/1998 | Vijaykumar | 707/100 |
| 5,778,370 A | 7/1998 | Emerson | 707/100 |
| 5,805,615 A | 9/1998 | Chen | 714/757 |
| 5,848,405 A | 12/1998 | Norcott | 707/1 |
| 6,047,285 A | * 4/2000 | Jacobs et al. | 707/4 |

FOREIGN PATENT DOCUMENTS

| | | | |
|---|---|---|---|
| EP | 858043 | 2/1998 | G06F/17/50 |
| JP | 07295868 | 4/1994 | G06F/12/00 |
| WO | WO09101530 | 7/1990 | G06F/11/00 |

OTHER PUBLICATIONS

IBM Technical Disclosure Bulletin (1996) "Distributed Parallel Build System for Hierarchically Organized Large Scale Software Systems," 39(6):63–68.

IBM Technical Disclosure Bulletin (1995) "Referential Integrity Implementation Details and Advantages," 38(3):477–487.

M. Benedikt et al. (1998) "Verifiable Properties of Database Transactions," Proc. of the 15th ACM SIGACT–SIGMOD–SIGART Symposium on Principles of Database Systems. p. 117–127 (Abstract 1–pg.).

(List continued on next page.)

Primary Examiner—Sanjiv Shah
(74) Attorney, Agent, or Firm—Gates & Cooper LLP

(57) ABSTRACT

The invention provides method and apparatus for use in a database management system for managing a database containing data, where the database has storage for storing data in the database, and has an instruction processor for processing instructions for managing data stored in the database. The database has a constraint manager for managing constraints on said data stored in the database. The invention provides efficient method and means for deferred checking of data after bulk loading into said database for violation of constraints by determining an appropriate procedure for constraint checking by determining whether constraint checking is required; and if it is required, determining whether to implement full, or incremental checking for compliance with said constraints; and then checking the data in the database in accordance with the determined constraint checking procedure.

63 Claims, 15 Drawing Sheets

OTHER PUBLICATIONS

M. Benedikt et al. (1998) "Verifiable Properties of Database Transactions," Information and Computation 147(1):57–88 (Abstract 1-pg.).

P. Asirelli et al. (1988) "Improving Integrity Constraint Checking in Deductive Databases," ICDT '88. $2^{nd}$ Int'l Conf. On Database Theory Proceedings, pp. 72–86 (Abstract–1 pg.).

D. Beneventano et al. (1996) "Consistency Checking in Complex Object Database Schemata With Integrity Constraints," Proc. of the Fifth Int'l Workshop on Database Programming Languages (Abstract–1 pg.).

A. Jorge and P.B. Brazdil (1997) "Integrity Constraints in ILP Using a Monte Carlo Approach," Inductive Logic Programming. $6^{th}$ Int'l Workshop, ILP–96, Selected Papers, pp. 229–244 (Abstract–1 pg.).

C. Martin et al. (1996) "An Integrity Constraint Checking Method for Temporal Deductive Databases," Proc. Third Int'l Workshop on Temporal Representation and Reasoning, pp. 136–141 (Abstract–1 pg.).

U. Herzog et al. (1995) "Parallel Execution of Integrity Constraint Checks," Proc. of the 1995 ACM CIKM Int'l Conf. On Information and Knowledge Management, pp. 82–89 (Abstract–1 pg.).

Liu Bing (1995) "A Unified Framework for Consistency Check," Int'l Journal of Intelligent Systems, 10(8):691–713 (Abstract–1 pg.).

J. Chomicki et al. (1995) "Implementing Temporal Integrity Constraints Using an Active DBMS," IEEE Transactions on Knowledge and Data Engineering, 7(4):566–582 (Abstract–1 pg.).

D. Toman et al. (1994) "Implementing Temporal Integrity Constraints Using an Active DBMS," Proc. Fourth Int'l Workshop on Research Issues in Data Engineering Active Database Systems, pp. 87–95 (Abstract–1 pg.).

* cited by examiner

SYSTEM AND METHOD FOR SELECTIVE INCREMENTAL DEFERRED CONSTRAINT PROCESSING AFTER BULK LOADING DATA

BACKGROUND OF THE INVENTION

1. Field of the Invention

This invention relates generally to Relational Database Processing Systems, and in particular, to constraint checking and violation capture for bulk data stored in a relational database.

2. Description of the Related Art

A relational database management system (RDMS) uses relational techniques for storing and retrieving data. Relational databases are computerized information storage and retrieval systems in which data in the form of tables ("relations") are typically stored for use on disk drives or similar mass data stores. A "relation" includes a set of rows ("tuples" or "records") spanning one or more columns. A "record" expresses a mathematical relation between its column elements. Reference is made to C. J. Date, An Introduction to Database Systems, vol. 1, 4th edition, Addison-Wesley Publishing Co. Reading Mass. (1986) for a description of a relational database management system.

An RDMS receives and executes commands to store, retrieve and delete data using high-level query languages such as the Structured Query Language (SQL). The term "query" means a set of commands for acting on data in a stored database. An SQL standard has been maintained by the International Standards Organization (ISO) since 1986. Reference is also made to the SQL-92 standard "Database Language SQL" published by the American National Standards Institute (ANSI) as ANSI X3.135-1992 and published by the ISO as ISO/IEC 9075:1992 for the official specification of the 1992 version of the Structured Query Language. See also James R. Groff et al. (LAN Times Guide to SQL, Osborne McGraw-Hill. Berkeley, Calif. 1994) for a description of SQL-92.

A table in an RDMS is partitioned into rows and columns such that there is one value at each intersection of a row and column. All of the values in a column are of the same data type. The only exception to this rule is that a value could be NULL. A NULL is a marker used to fill a place in a column where data is missing for some reason.

Tables are created explicitly by using the SQL CREATE TABLE command. A table may be created as "permanent", "temporary", or "virtual". Permanent tables include the base tables that contain the fundamental data that is permanently stored in the database. Fundamental data refers to the data for which the database is created to manage in the first place for example, records of a group such as employees or students. Virtual tables—also called "views"—are tables derived from base tables using queries. A view does not exist in the database as a stored set of values like a base table. Instead the rows and columns of data visible through the view are the query result produced by the query that defines the view. The definition of the view is stored in the database. Temporary tables are not permanently stored, but are used for handling intermediate results, Similar to program variables. Temporary tables are automatically flushed at the end of a working session. A table may be created, yet not have any data in it. Such a table, referred to as "empty", is typically created for receiving data at a later time.

"Constraints" define conditions that data must meet to be entered into a permanent table of fundamental data. Constraints may apply to columns or to tables, they are checked by an RDMS. A constraint can be checked at any of the following times:

(1) after every statement that affects a table (e.g., after an INSERT query):

(2) at the end of a transaction executing one or more statements that affect a table: and (3) at any time between 1 and 2.

Frequently, in large commercial database systems, data must be entered quickly and in bulk. Bulk-loading facilities, available for this purpose, load database tables at high speed from files outside an RDMS.

Because bulk-loading delivers massive amounts of data in a short amount of time, constraint checking can impose a severe bottleneck if not deferred until all of the data is loaded.

Even if deferred, constraint checking that must check each record one time for one constraint violation, flag the violation, and then check the same record again for each remaining constraint will consume a large amount of time, compounding the cost of bulk loading. Clearly, there is a need in the art for a utility that can check all constraints simultaneously for each record that requires checking in a given table to improve efficiency.

Recently, bulk loading tools have been provided which do not perform constraint checking. A table receiving bulk-loaded data is placed in a "pending" state, meaning its data cannot he used until checked for constraints. What is needed is a tool for checking for constraints of such bulk-loaded data that can do so speedily and which also includes the capability of repairing such tables to remove violating records.

Referential Integrity

In any tool that performs constraint checking of bulk-loaded data the problem of ensuring that no constraints are violated is complicated by the need to ensure "referential integrity" at the database. Referential integrity ensures soundness of an entire database. Relatedly, consider the example of an employee database with a table that groups employees by department and a table that contains all possible departments of an employing organization. In this case, the table of employees would include a column representing the respective employees' department numbers. The employee department number value is a "foreign key" that references an unique identifying column in the table containing all the departments in an employing organization. The second table, in this case, is the "parent table". The unique identifying column in the parent table identifying department titles is referred to as a "primary key". Referential integrity is the state when all foreign key values are present in their parent keys. If an employee's department is eliminated and its corresponding record is deleted from the parent table, then the foreign key in the employee records representing that department, is invalid. In such a case, the system would lack referential integrity. Although the above simple example shows a foreign and primary key having only one column referential integrity can be assured using multi-column keys.

In the above example, the record for the employee having no department is said to be "orphaned" because the foreign key has no parent table. A typical SQL technique for dealing with orphans is to eliminate them when their parent references are eliminated. A function known as CASCADE is available in SQL for ensuring that records having foreign keys are eliminated when their referenced primary keys are eliminated.

Table Check Constraints

Valid data within the table can be enforced through table check constraints. Table check constraints specify search conditions that are enforced for each row of a table.

A table check constraint can be used for validation. Examples of some constraints can be: the values of a department number must lie within the range 10 to 100; the job title of an employee can only be "Sales", "Manager", or "Clerk"; or an employee who has been with the company for more than 8 years must earn more than $40,500.

What is needed is an efficient tool and method for checking constraints that includes referential integrity and table check constraints (for bulk-loaded data in a pending table that includes a violation capture mechanism).

Figure 1:
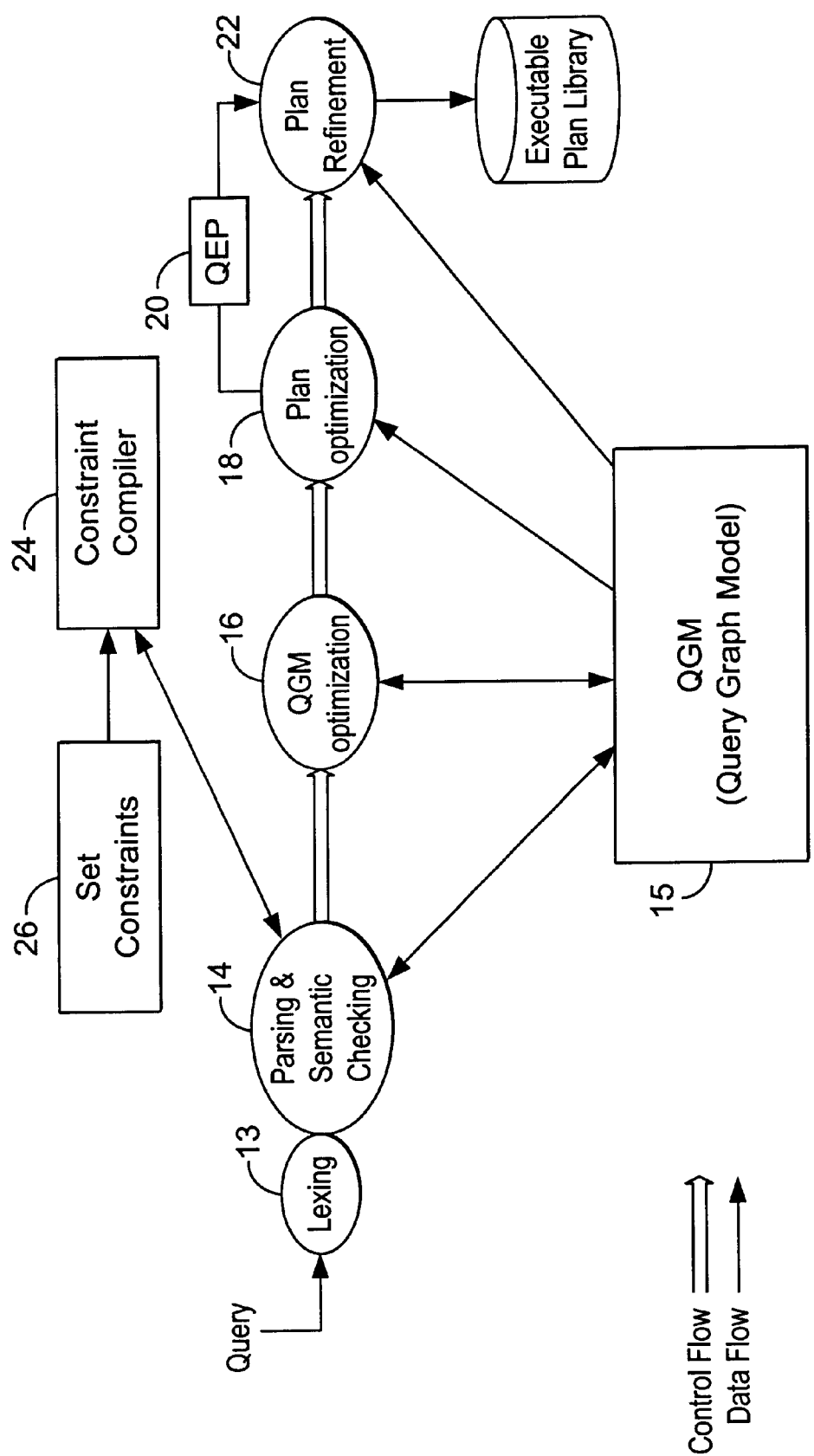
FIG. 1 shows a schematic representation of the query translation process using the method of U.S. Pat. No. 5,706,494.

Referring now to the drawings in which like reference numbers represent corresponding parts throughout in FIG. 1 a query translation process used in the prior art IBM Starburst relational database management system (Starburst RDMS) is shown with modifications necessitated for enabling the invention of U.S. Pat. No. 5,706,494. The IBM Starburst RDMS is described in detail in L. M. Haas, et at., "An Extensible Processor for an Extended Relational Query Language", IBM Research Report, RJ 6182, IBM Almaden Research Centers San Jose, Calif., Apr. 1988.

Overview of Query Translation Process with SET CONSTRAINTS

Queries written in SQL, or the like, are processed in phases as shown in FIG. 1. An SQL query is first lexed at 13, parsed and checked semantically at 14, and converted into an internal representation denoted as the Query Graph Model (QGM) 15. The QGM is a well-known data structure that summarizes the semantic relationships of the query for use by all components of the query compiler. A QGM optimization procedure 16 then rewrites the QGM in canonical form by iteratively transforming the QGM into a semantically equivalent QGM 15. Reference for explanation regarding such optimization is made to W. Hasen, et al., "Query Rewrite Optimization in Starburst", IBM Research Report, RJ 6367, IBM Almaden Research Center San Jose, Calif. Aug. 1988.

The purpose of QGM optimization 16 is to simplify QGM 15 to help the subsequent plan optimization process to produce improved Query Execution Plans (QEPs). A plan optimization procedure 18 generates alternative QEPs, and chooses the best QEP 20, based on estimated costs. The plan refinement procedure 22 transforms the best QEP 20 further by adding information necessary at execution time to make QEP 20 suitable for efficient execution. QGM optimization step 16 is separate and distinct from QEP optimization step 18. For instance, reference is made to U.S. Pat. No. 5,345,585 issued to Iyer et al., for a discussion of a useful join optimization method suitable for use in QEP optimization step 18. Reference is also made to U.S. Pat. No. 5,301,317 issued to Lohman et al., for a description of an adaptive QEP optimization procedure suitable for step 18.

U.S. Pat. No. 5,706,494 enabled constraint checking of bulk-loaded data by using a QGM 15, the known constraint engine combined with a known SQL compiler, this combination being denoted as the constraint compiler 24, and a module 26 described below. For an understanding of QGM 15 characteristics, reference is made to Hamid Pirahesh, et al., "Extensible/Rule Based Query Rewrite Optimization in Starburst," Proceedings of ACM SIGMOD '92 International Conference on Management of Data, San Diego, Calif., 1992. Among other characteristics, QGCM 15 embraces the concepts of (a) quantifiers or record variables, (b) predicates, and (c) SELECT operations.

One aspect of U.S. Pat. No. 5,706,494 is embodied as a particular program object module coupled with computer hardware, shown in FIG. 3 and discussed in detail below. This module is represented schematically in FIG. 1 at 26, and is denominated as the "SET CONSTRAINTS MODULE". Preferably, the method performed partly by this module is implemented in software, but it may also be embodied as hardware logic that implements the rules described below in connection with the flow charts in FIGS. 4–8. Further, it may be embodied as software code stored in any useful recording medium, including being recorded magnetically on a computer disk, (not illustrated).

The QGM

Figure 2:
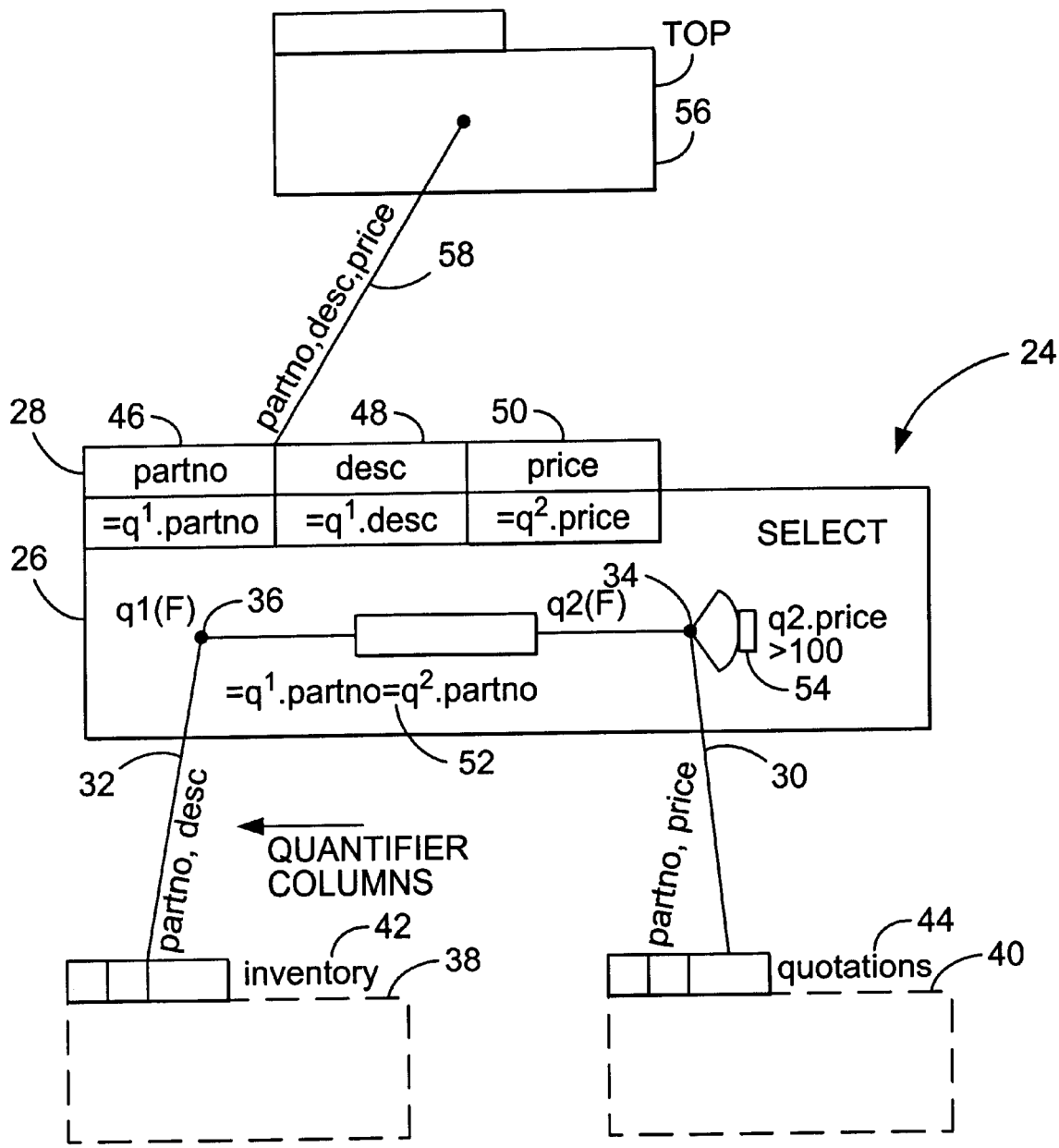
FIG. 2 shows a Query Graph Model (QGM) diagram from the prior art for an exemplary SQL, query.

A useful QGM known in the art is now described. FIG. 2 provides a QGM representation of the following SQL query:

SELECT DISTINCT Q1.PARTNO, Q1.DESCP, Q2.PRICE.

FROM INVENTORY Q1, QUOTATIONS Q2

WHERE Q1.PARTNO=Q2.PARTNO

AND Q2.PRICE>100

A SELECT box 24 is shown with a body 26 and a head 28. Body 26 includes dataflow arcs 30 and 32, which are also shown as the internal vertices 34 and 36. Vertex 36 is a set-former that ranges on (reads from) the box 38, which provides records on arc 32. Similarly, vertex 34 ranges on box 40, which flows records on dataflow arc 30. The attributes to be retrieved from the query, PARTNO 46, DESC 48 and PRICE 50, are in head 28. Boxes 38 and 40 represent the base-relations accessed by the query, INVENTORY 42 and QUOTATIONS 44, respectively. Box 24 embraces the operations to be performed on the query to identify the PARTNOs that match in the two base-relations, as required by the join predicate 52 represented as an internal predicate edge joining vertices 34 and 36. Vertex 34 also includes a self-referencing predicate 54 to identify prices of those PARTNOs that exceed 100.

For the purposes of this illustration, note that each box or node (formally denominated "quantifier node") in FIG. 2 is coupled to one or more other nodes by dataflow arcs (formally denominated "quantifier columns"). For instance, base-relation node 38 is coupled to select node 24 by data-flow arc 32 and base-relation node 40 is connected to select node 24 by data flow arc 30). The activities inside select node 24 produce a new stream of data records that are coupled to the TOP node 56 along a dataflow arc 58. TOP node 56 represents the data output table requested by the query.

The object of several known QGM optimization procedures is to merge one or more nodes where possible by eliminating (collapsing) dataflow arcs. For instance, the above-cited Pirahesh et al. reference describes a set of rules for merging any number of nodes into a single SELECT node, with certain restrictions on non-existential or non-Boolean factor subqueries, set operators, aggregates and user-defined extension operators. Thus those skilled in the art know that QGM optimization step 16 usually rewrites the QGM to eliminate numerous nodes and data-flow arcs even before considering useful query execution plans in plan optimization step 18 (FIG. 1).

Ensuring Referential Integrity (RI).

One or more columns in a base-relation may be assigned a "key attribute", such as "primary key" or "foreign key". The primary key of a base-relation uniquely identifies each record (row) in the relation. A foreign key establishes a "referential" relationship between the base-table (child) and another (parent) table designated by the foreign key column attribute. A unique key is a set of columns whose values uniquely determine a record in the table, so a primary key is, by definition, a unique key. Thus, a parent/child relationship may be established between two relations by adding a foreign-key attribute to one and relating it to a unique key attribute in another, as is well-known in the art. Such relationships may be added without limit and each key attribute may span several columns.

Generally speaking, a referential constraint relates a possibly multi-column foreign key from the child table to an unique key in the parent table. There is only one primary key in a table, but there may be many unique keys.

There are four types of database updates that can corrupt the referential integrity of the parent/child relationships in a database. These include (a) inserting a new child record, (b) updating the foreign key in a child record, (c) deleting a parent record, and (d) updating the primary key in a parent record.

When a new row is inserted into the child table, its foreign key value must match one of the primary key values in the parent table, according to the column attribute. If the foreign key value does not match any primary key, then an attempt to insert the row is rejected since it will corrupt the database to allow a child to exist without a parent. Inserting a row in a parent table never gives this problem because it simply becomes a parent without children. Updating the foreign key in a child record is a different form of this problem. If the foreign key is modified by an UPDATE statement, the new value must match some primary key value in the parent relation to avoid "orphaning" the updated record.

Upon deletion of a parent record that has one or more children, the child records are orphaned because their foreign key values no longer match any existing primary key value in the parent relation. Deleting a record from the child relation is no problem because the parent merely loses a child. Updating the primary key in a parent record is a different form of this problem. If the primary key of a parent record is modified, all existing children of that record become orphans because their foreign key values no longer match an existing primary key value.

For each parent/child relationship created by a foreign key, SQL provides for an associated delete rule and an associated update rule. The delete rule specifies DBMS action when a user tries to delete a parent record. Available rules include RESTRICT, CASCADE, SET NULL, and SET DEFAULT. The update rule also specifies one of these DBMS actions when the user tries to update the value of one of the primary key columns in the parent relation. The usual RESTRICT rule merely rejects the attempted operation. The CASCADE rule automatically deletes and updates records from the children responsive to a command to delete or update a parent record.

System Overview

Figure 3:
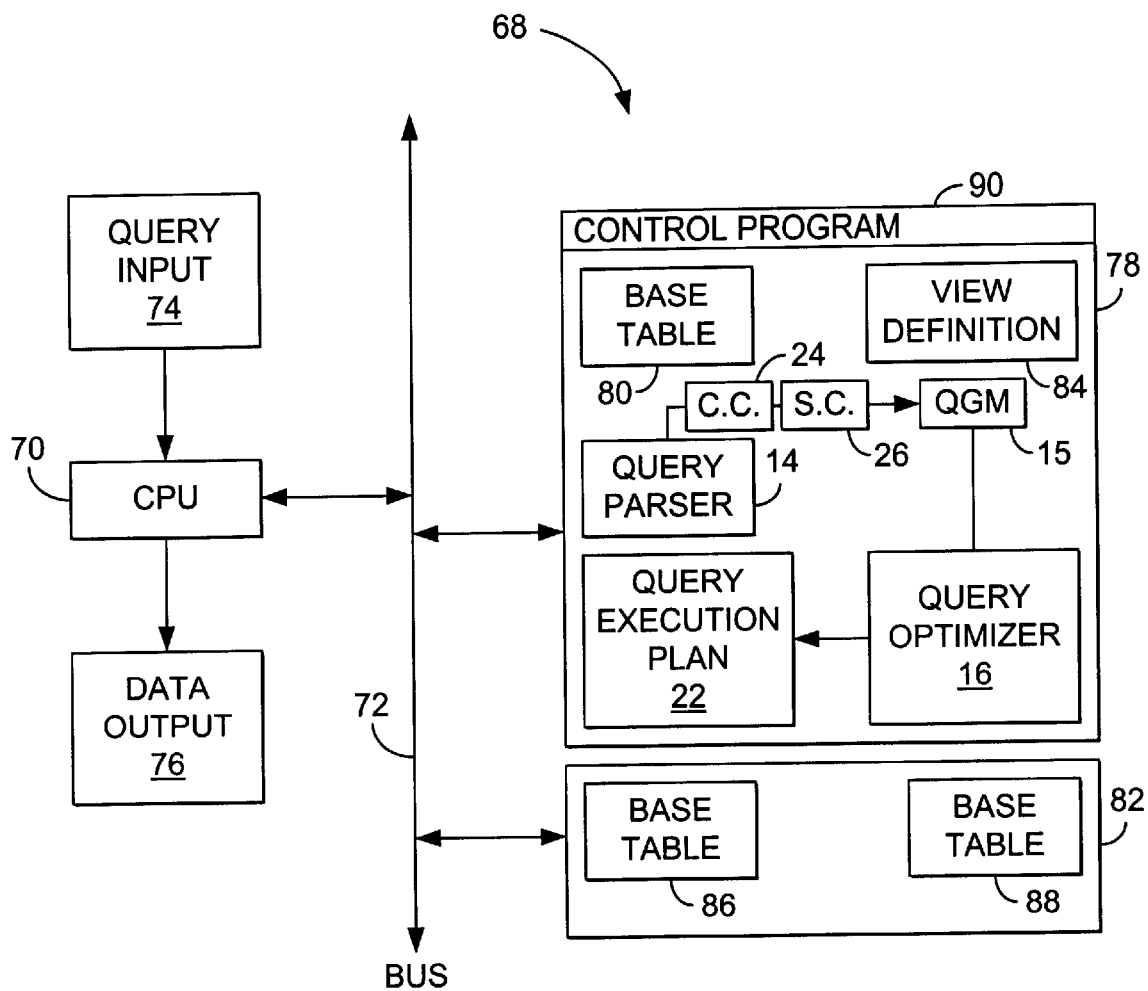
FIG. 3 is a functional block diagram of a relational database system suitable for application of the bulk data constrain checking system of this invention.

FIG. 3 shows a functional block diagram of a computer-implemented database processing system 68 suitable for practicing the procedure of this invention. This exemplary configuration is described for illustrative purposes only and it should be appreciated that the process and system of this invention can be embodied within system 68 in many different useful fashions, including the arrangement depicted in FIG. 3. System 68 includes a central processing unit (CPU) 70, which is coupled to a parallel bus 72. The query input terminal 74 allows the user to enter queries into system 68, either from a remote terminal or through any other useful method known in the art. As used herein, a "user query" includes a combination of SQL commands intended to produce one or more output data tables according to specification included in the query. The data output terminal 76 displays the query results to the user and may be physically co-located with query input terminal 74.

System 68 includes the address space 78, which is shown schematically as containing program objects and data objects. The base table 80 is an example of a data object pulled into address space 78 from the external mass store 82 by way of bus 72. The view definition 84 is another data object representing a "virtual table" made up of elements from one or more base tables in accordance with a VIEW definition statement. External mass store 82 includes a generally large plurality of base tables (also denominated base relations), exemplified by base tables 86 and 88. These base tables are moved partially or entirely between memory space 78 and external mass store 82 in a manner well-known in the art for database management systems.

Address space 78 also includes the control program object 90, which manages the other components of system 68. These components include the query parser 14 for accepting the query input from terminal 74 and forwarding it to the Query Graph Model (QGM) optimizer 16. The Constraint Compiler (C.C.) 24 and the Set Constraints (S.C.) Module 26 interact between the parser and the QGM.

The QGM optimizer rewrites the QGM representation of the user query to provide a "canonical form" of the QGM for output to the query optimizer 16. For instance, a QGM canonical form may include a large cyclical join graph organized within a single select node having dataflow arcs from many base-tables, subject to the restrictions of primary and referential integrity. After identifying an "optimal" query execution plan, optimizer 16 produces this plan as a program object, depicted as query execution plan 22 in address space 78. Plan 22 is finally executed with the assistance of control program 90 and the resulting relation is forwarded to data output of display 76 upon completion. It can be appreciated by those skilled in the art that the description of system 68 in FIG. 3 is exemplary and that the system and process, represented as the SET CONSTRAINTS processing module 26, may be incorporated in any RDMS that uses a query optimization process.

General Syntax

To aid in understanding this invention, a brief discussion of important SQL statements are included below.

In SQL, a SELECT statement is used to retrieve data and generally comprises the format: "SELECT<clause>FROM<clause>WHERE<clause>GROUP BY<clause>HAVING<clause>ORDER BY<clause>." The clauses generally must follow this sequence, but only the SELECT and FROM clauses are required. The result of executing a SELECT statement is a subset of data retrieved by the RDMS software from one or more existing tables or views stored in the relational database, with the FROM clause telling the RDMS software the name of the table or view from which the data is being selected. The subset of data is treated as a new table, termed the "result table", which typically comprises a temporary table. In general, the items specified in the SELECT clause of the SELECT statement determine the columns that will be returned in the result table from the table(s) identified in the FROM clause.

The WHERE clause determines which rows should be returned in the result table. Generally, the WHERE clause contains a "search condition" that must be satisfied by each row returned in the result table. The rows that satisfy the search condition form an intermediate set, which is then processed further according to specifications in the SELECT clause. The search condition may include one or more predicates, each of which specify a comparison between two or more column values, constants or correlated values. Multiple predicates in the WHERE clause are themselves connected by Boolean operators.

A JOIN operation combines tables or views by appending rows from one table or view to another table or view. The rows, or portions of rows, from the different tables or views are concatenated horizontally through common columns. The JOIN operation is not provided explicitly as an SQL statement; instead it may be implied by naming more than one table or view in the FROM clause of the SELECT statement. Although not required, JOIN operations normally include a WHERE clause that identifies the columns through which the rows can be combined. The WHERE clause may also include one or more predicates in a subquery with conditional operators that are used to select the rows to be joined.

An INSERT statement adds data to a database according to the format: "INSERT INTO table.name VALUES (constant [, . . . ]|NULL)." INSERT fills one entire row in a single execution using the constants provided in the VALUES clause. Constraints are set for each table column when it is created, and a failure to comply with the table or column constraints will cause the INSERT to fail with an error. The SQL compiler has means for generating an internal process that compiles in the code to check constraints against the data modified by the SQL command.

The DELETE statement may be used to remove data according to the format: "DELETE FROM table.name [WHERE]." DELETE erases all records of the table which satisfy the WHERE clause's predicates.

A predicate is an expression that is used in certain statements to test values and determine whether the effects of the statement should be applied to their values. A predicate may have a Boolean value of TRUE, FALSE, or UNKNOWN. The UNKNOWN value results when NULLS are used in comparisons. In terms of constraint checking, NOT NULL means that a column being checked may not contain the NULL value.

Understanding of the process described below will be improved by referring to the symbols table included below. The symbol tables include brief definitions of the symbols used in a preferred embodiment of pseudo-code useful for implementation this invention.

Formalisms

A raise error function raises a given error and rolls back the statement whenever it is invoked.

In addition to deleting (or inserting) the selected rows from (or into) the first table listed in the FROM (or INTO) clause, a DELETE (or INSERT) operator can also flow data into other operators just like a select. For example:

select $c_1$, 2 from (delete $c_1$, 5 FROM T where $c_1>5$);

selects a record with two columns for each record deleted from T. The first column is the value of the $c_1$ column of the deleted record and the second column is always 5.

This is used in generated queries to insert the values of the deleted records along with some computed information about which constraints are violated into exception tables. For example, the following query deletes all records from T and inserts columns $c_1$, $c_2$, and $c_3$ of each deleted record into table E.

insert into E (delete $c_1$, $c_2$, $c_3$, FROM T)

The existence of a COMPOUND SQL allows a grouping of a set of SQL statements together, and allows them to share common subexpressions. For example:

begin
   insert into $T_1$ select * from $T_1$;
   create temporary table DT as (delete from $T_2$)
   insert into $E_2$ select * from DT;
end This query first replicates the contents of $T_1$, then deletes all records from $T_2$ and inserts the deleted records into table $E_2$.

Implementation of the Method

U.S. Pat. No. 5,706,494 disclosed a method and tool for constraint-checking of bulk-loaded data after storage in a relational database, that also ensures referential integrity.

Figure 4:
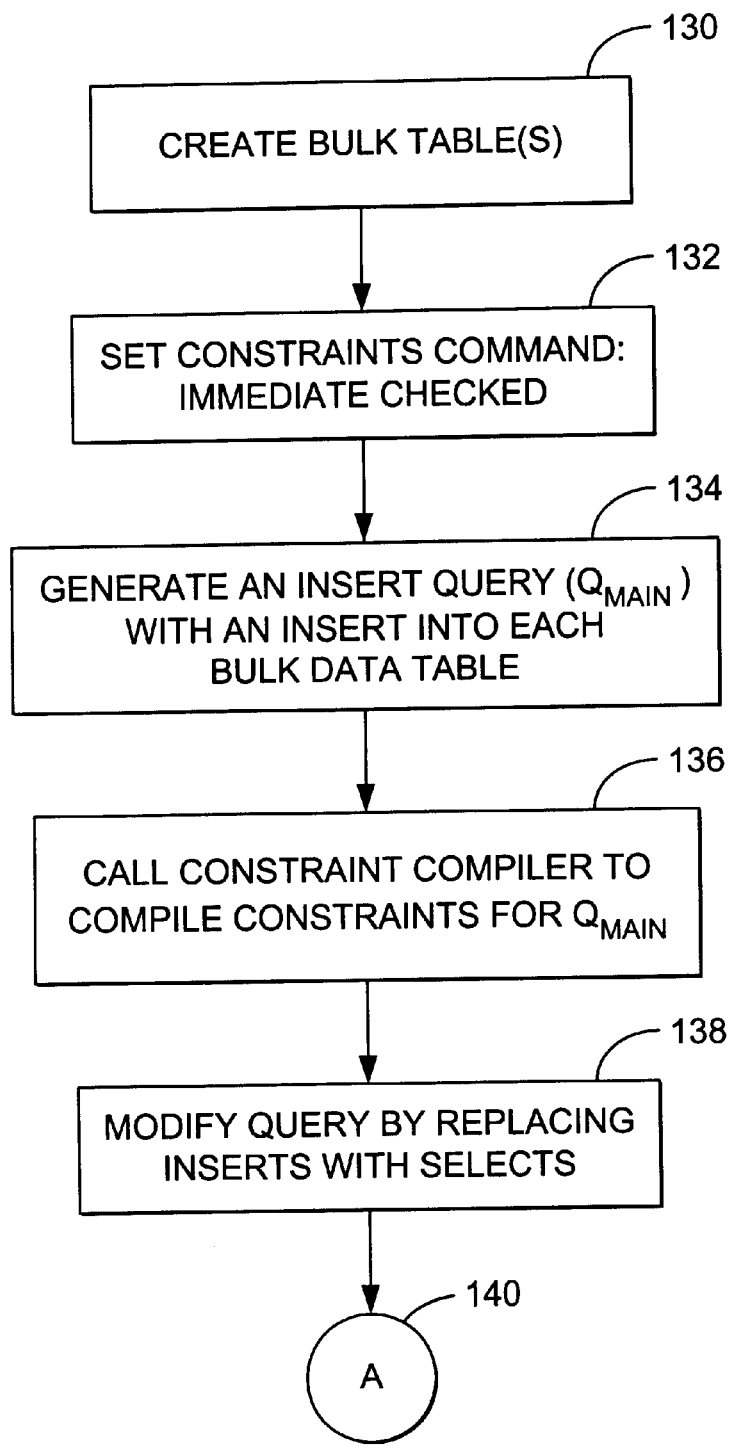
FIGS. 4–8 each provide a flow chart illustrating the steps employed in executing the method of U.S. Pat. No. 5,706,494.

Referring to FIG. 4, the process is implicitly started by the bulk loading of one or more tables $\{T_i\}$ in mass store 82, as shown in step 130. Such a table $T_i$ will be placed in a pending state until constraints are checked. Table Ti can be represented by either table 86 or 88 (FIG. 3). The SET CONSTRAINTS process is initiated by an invocation command, for example, "SET CONSTRAINTS COMMAND", as shown in step 132. The invocation command may be performed as an SQL query or may be automatically passed to processor 70. Referring to FIG. 4, the invocation command causes the SET CONSTRAINTS module to generate an INSERT query denoted as QMAIN for inserting one or more records into a bulk-loaded table in an RDMS, step 134. The processor then called an SQL compiler to compile an SQL INSERT command. The code generated to execute the INSERT included code to check for constraint violations in the records to be inserted step 136. However, before compiling optimizing, and executing the compiled code, the method replaced an INSERT command with a SELECT command, step 138 thereby enabling the resulting code to "constraint-check" the bulk-loaded data by selecting records that were in violation of the column constraints.

The INSERT query denoted as QMAIN is really a "dummy" insert of records that purportedly are to be inserted in the table $T_i$ as shown in step 134.

Referring again to FIG. 4, when the dummy INSERT inquiry is generated, then the constraint compiler 24 (FIG. 3) is called to compile the INSERT commands and check for constraint violations, as shown in step 136. The compiler 24 compiles QMAIN and produces a query that has been modified to provide the code for checking constraints. QMAIN is then modified to replace the INSERT commands with SELECT commands (step 138) producing a new query for checking bulk loaded data.

Figure 5:
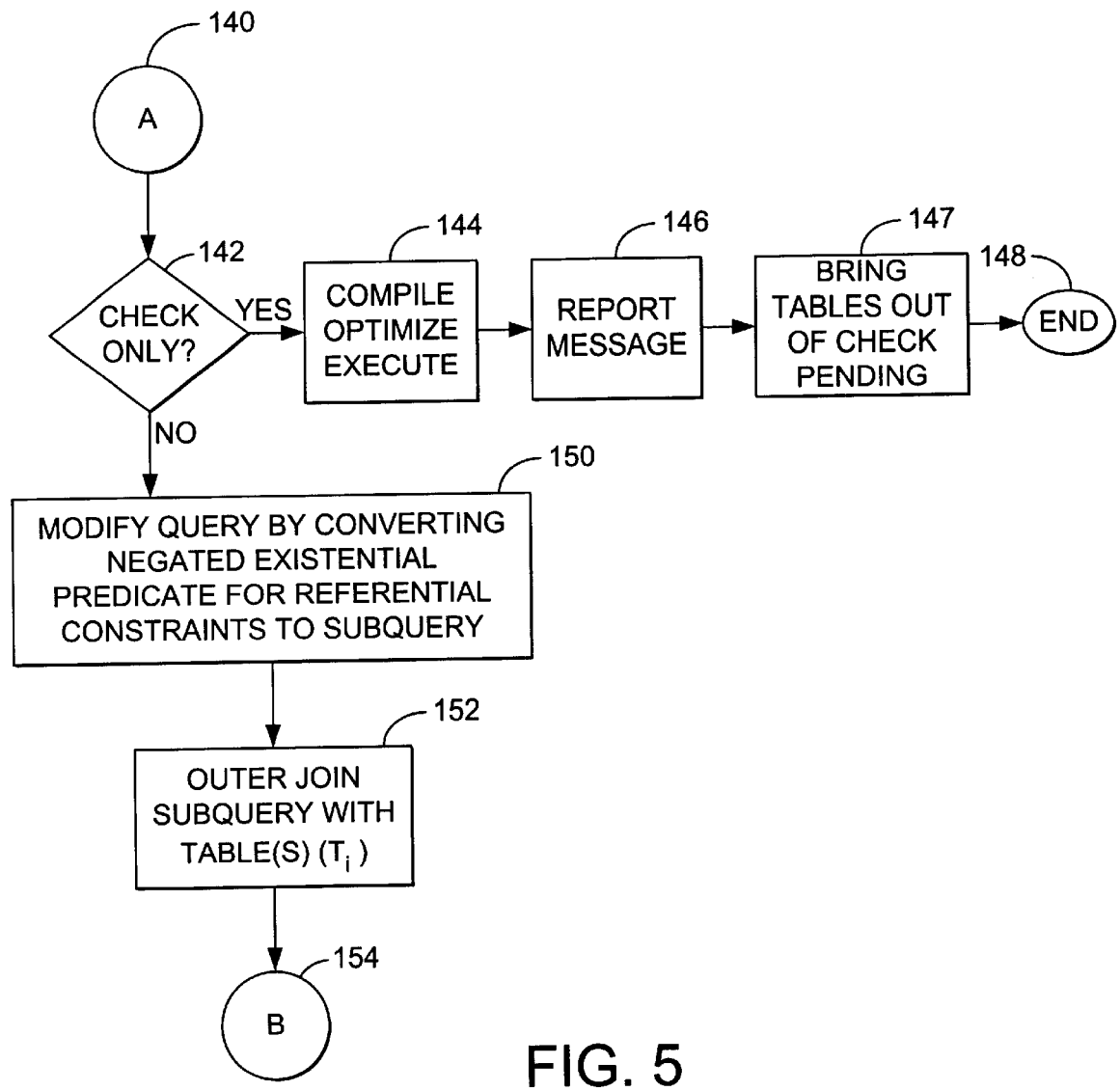

Referring to FIGS. 4 and 5, the processing of the SET CONSTRAINTS continues at step 140, signifying the continuity of flow between FIGS. 4 and 5. A determinative step 142 asks if the control program or a user requires only intonation that an error has occurred when the first constraint violation is found. If so, then this case is denoted as "check only". If "check only" is performed, then in step 144 the query of the type shown in Table 3 is compiled, optimized and executed, according to normal QGM processing discussed with reference to FIG. 1 above. The error data reporting message generated in step 146 is then communicated. For example, it may be passed to display 76 no or recorded in mass storage unit 82 for later retrieval. In step 147, if there are no errors, tables are taken out of the pending state.

Referring again to FIG. 5, if more than "check only" information is required, processing continues as shown at step 150. Before compiling a query, it is modified by convening negated existential predicates for referential constraints to subquery form. At step 152, the subquery is outer-joined with its corresponding tables.

Figure 6:
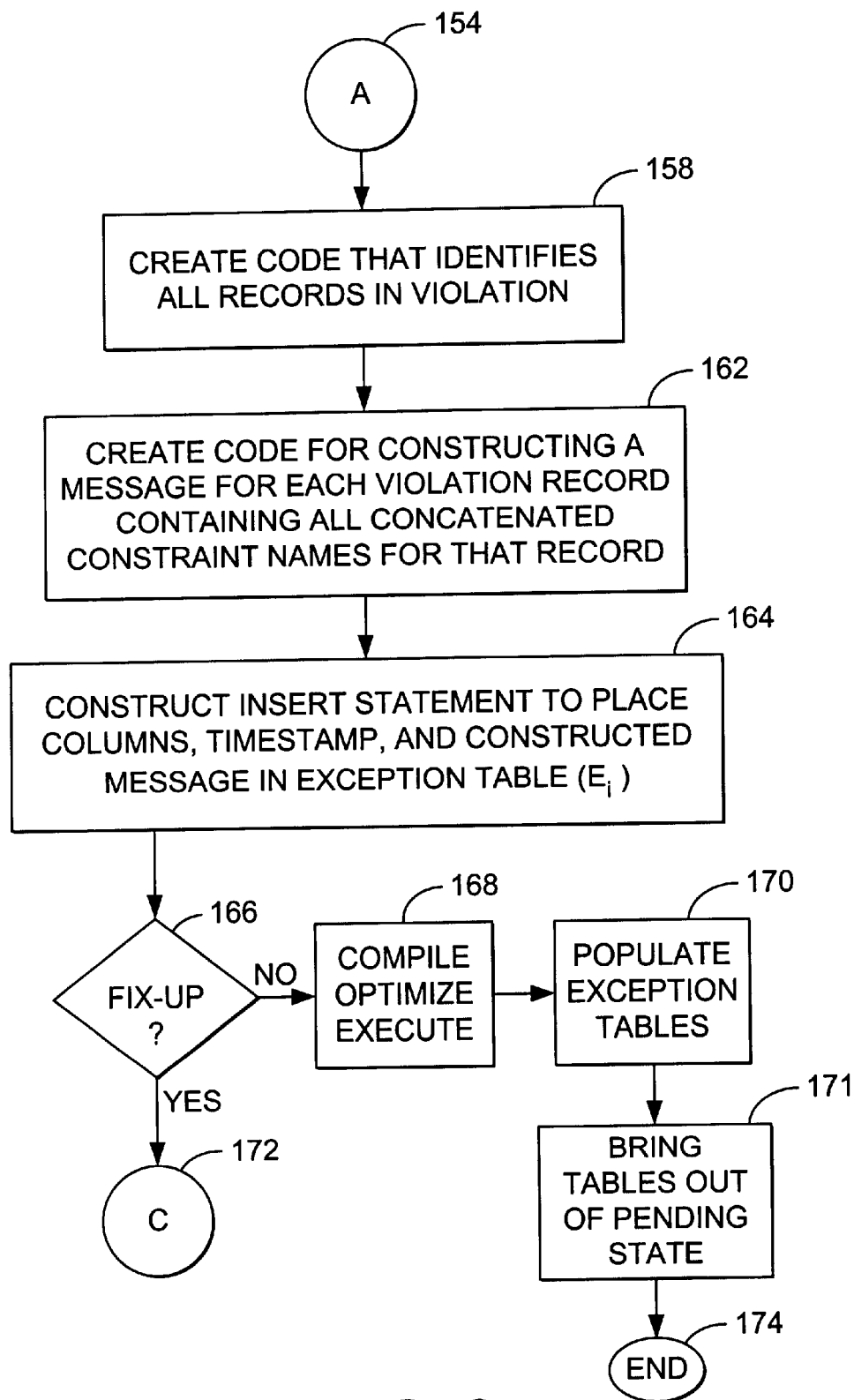

Referring to FIGS. 5 and 6, processing continues from step 154 to step 158. Step 158 creates code that identifies all records in the one or more tables Ti that exhibit constraint violations, either by violating a check constraint or by violating referential integrity. In step 162, the SET CONSTRAINTS module generates code that can construct a message for each record in violation that contains all constraint names for all records in violation. The message contains all of the constraint names concatenated in a string. After the code for creating the messages is created, then, in step 64, the SET CONSTRAINTS module constructs an INSERT statement that serves to place information in a new table. The new table will contain columns identifying records that are in violation of constraints, and will include for each identified record a timestamp indicating a reporting time, and the constructed message. This new table is denominated "the exception table" and is denoted herein as $E_i$.

Referring now to FIGS. 6, the above described information is used to automatically flag an error and identify it, such as "Permissible Age Range Exceeded", and will also show the offending record column entry, such as "19 years of age", as well as the other columns in the record. Preferably, the information includes the timestamp to indicate when the error was flagged. Step 166 inquires if it is desirable to "fix-up" the table(s) having violations. "Fix-up" refers to deleting records in violation of constraints, both primary and referential and also requires removing orphaned records from the database. If no fix-up is desired, steps 168, 170 and 174 are executed. The non-fix-up case ends with step 174. In step 168, the constructed modified query is compiled, optimized and executed according to the normal query translation process described above with reference to FIG. 1. Then the exception table Ei is populated using the INSERT statement generated in step 164. The non-fix-up case ends in step 174. In step 171, if there are no errors then tables are brought out of pending state.

Figure 7:
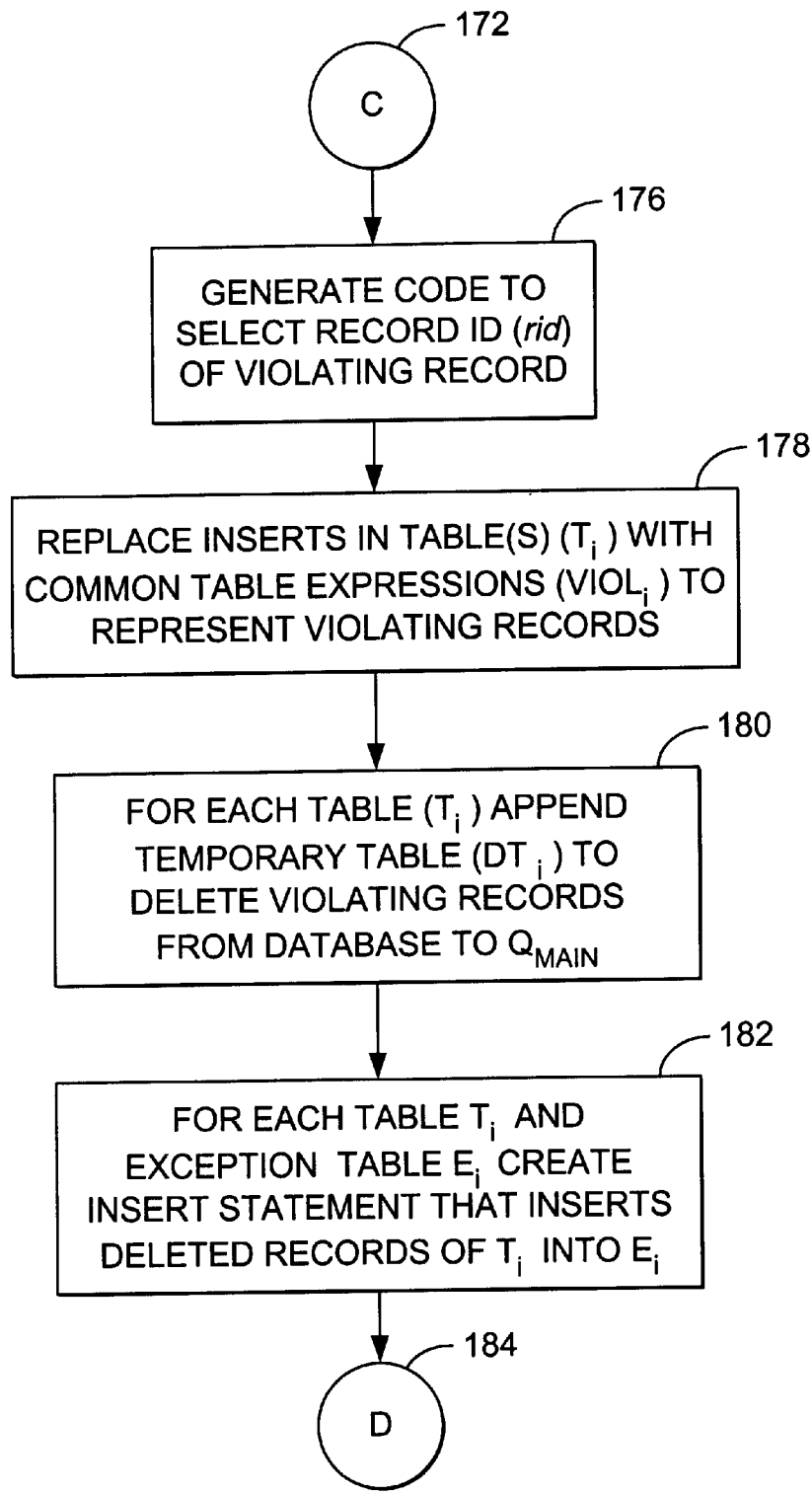

Referring to FIGS. 6 and 7, when repairing the database to erase records with column entry violations, processing continues to step 172.

In general, a DELETE statement must be applied before the INSERT in order to delete violating records from the database. The deleted records are then inserted into the exception table(s) $E_i$.

With reference now to FIG. 7, the processing of the SET CONSTRAINTS module implementing the fix-up case is described. In step 176, the module selects each record id (rid) for each record having violating entries. In step 178, the module implements a fix-up process, by replacing INSERTS with common table expressions ($VIOL_i$,) to represent violating records. In step 180, the module creates a temporary table $DT_i$ that is used later to select violating records to be deleted from the database.

The exception table is essentially a violation table that is used to flag all errors designating violations inherent in the original data before any violating records are deleted.

Figure 8:
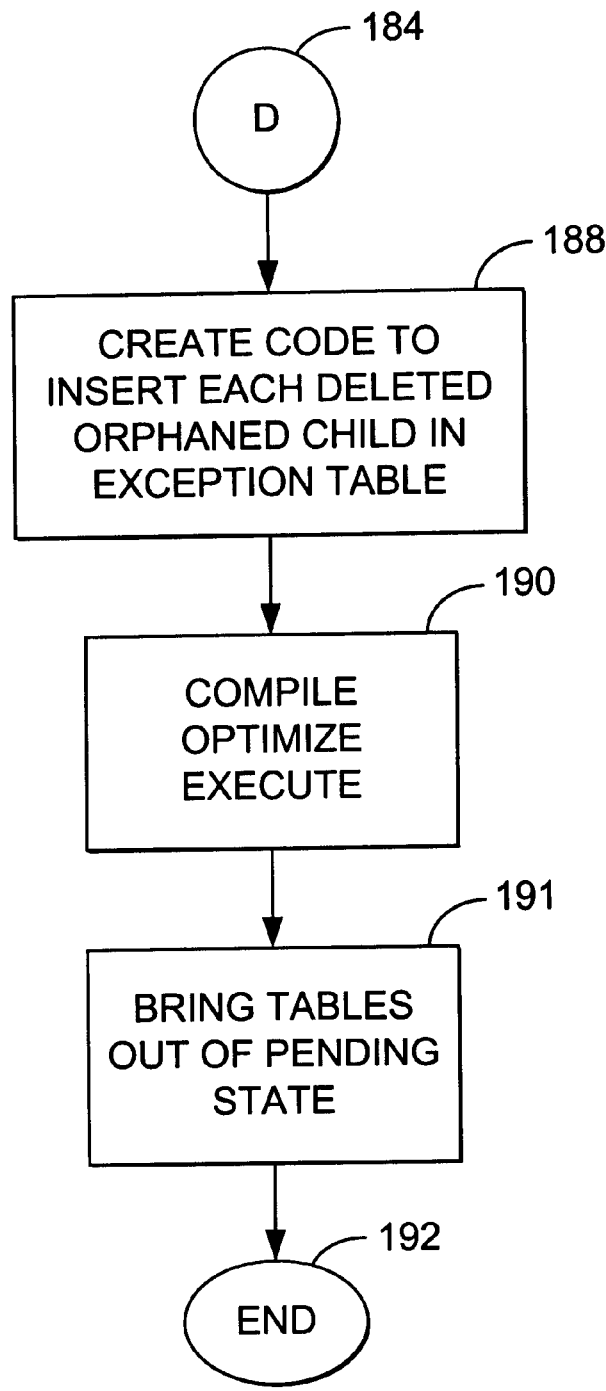

Referring to FIG. 8, processing continues from FIG. 7 as step 184 flows into step 188. The presence of the DELETE from a parent table in the query causes the constraint compiler to naturally compile in the code that eliminates orphan records, as shown in step 188. In this way, the orphaned children records can be inspected before they are erased. In step 190, the system of FIG. 3 carries out the constructed code created in the above steps, wherein the query is compiled, optimized, and executed in normal fashion, as described above with reference to FIG. 1. The tables are brought out of pending state in step 191. Processing of the method of this invention by the system of FIG. 3 ends in step 192.

Table 8 of U.S. Pat. No. 5,706,494 which follows, describes an example of a query for a check-only mode on a table EMP (Employee) and PROJ (Project). Three tables, EMP, DEPT and PROJ were created according to the following definitions:.

```
create table EMP    (empno int not null primary key,
                     deptno int,
                     age int,
                     constraint EMPDEPT foreign key
                     (deptno) references DEPT,
                     constraint MINAGE age > 16);
create table DEPT   (deptno int not null primary key,
                     name varchar(20),
                     mgrno int); and
create table PROJ   projno int not null primary key,
                     lead int,
                     constraint PROJLEAD foreign key
                     (lead) references EMP).
```

Tables employee (EMP), department (DEPT) and project (PROJ) are related by referential integrity constraints. Constraint EMPDEPT of table EMP ensures the referential integrity relationship between column deptno (foreign key) of table EMP and the column deptno (primary key) of table DEPT. Constraint PROJLEAD of table PROJ ensures the referential integrity between column lead (foreign key) of table PROJ and the column empno (primary key) of table EMP.

TABLE 8

```
1.  begin
2.      select 1
(3)         from EMP
(4)         where 1 = case
5.              when EMP.deptno is not null and
6.                  not exists
7.                      (select 1 from DEPT.deptno
```

TABLE 8-continued

```
 8.              where DEPT.deptno = EMP.deptno)
 9.           then raise-- error('-3603', EMPDEPT)
10.           when not EMP.age > 16)
11.           then raise-- error('-3603', MINAGE)
12.           else 2
13.       end
14.    select 1
15.    from PROJ
16.    where 1 = case
17.           when PROJ.lead is not null and
18.              not exists
19.                  (select 1 from EMP
20.              where EMP.empno = PROJ.lead)
21.           then raise-- error('-3603', PROJLEAD)
22.           else 2
23.    end
24. end
```

Table 11 of U.S. Pat. No. 5,706,494 which follows, describes an example of a fix-up mode query as follows:

TABLE 11

```
 1. begin
 2.    create temporary table ONEROW(c₁) as (values (1))
 3.    create temporary table VIOL_EMP (rid, empno, deptno, age,
           ts, msg) as
 4.       (select EMP.#rid, EMP.empno, EMP.deptno, EMP.age,
           current timestamp,
 5.            case when TEM_PEMPDEPT.x is not null and
 6.                   EMP.deptno is not null
 7.               then 'EMPDEPT' else"
 8.            end ||
 9.            case when not (age > 16)
10.               then 'MINAGE' else"
11.            end
12.       from EMP left outer join
13.            (select 1
14.            from ONEROW
15.       where
16.       not exists
17.            (select 1 from DEPT
18.            where DEPT.deptno = EMP.deptno)) as
                 TEMP_EMPDEPT
19.       where (TEMP_EMPDEPT.x is not null and
20.               EMP.deptno is not null)
21.       or
22.       not (age > 16))
23.    create temporary table VIOL_PROJ (rid, projno, lead, ts, msg) as
24.       (select PROJ.projno, PROJ.lead, current timestamp,
25.            case when TEMP_PROJLEAD.x is not null and
26.                 PROJ.lead is not null
27.            then 'PROJLEAD' else"
28.            end
29.       from PROJ left outer join
30.            (select 1
31.            from ONEROW
32.       where
33.       not exists
34.            (select 1 from EMP
35.            where EMP.empno = PROJ.lead)) as
                 TEMPPROJLEAD
36.       where TEMP_PROJLEAD.x is not null and
37.             PROJ.lead is not null)
38.    select * from VIOL_EMP;
39.    select * from VIOL_PROJ;
40.    create temporary table DT_EMP (empno, deptno, age, ts, msg) as
41.       (delete VIOL_EMP.empno, VIOL_EMP.deptno, VIOL_EMP.age,
           VIOL_EMP.ts, VIOL_CMP.msg
42.       from EMP, VIOL_EMP
43.       where EMP.#rid = VIOL_EMP.rid);
44.    create temporary table DT_PROJ (projno, lead, ts, msg) as
45.       (delete VIOL_PROJ.projno, VIOL_PROJ.lead, VIOL_PROJ.ts,
           VIOL_PROJ.msg
46.       from PROJ, VIOL_PROJ
47.       where PROJ.#rid = VIOL_PROJ.rid);
48.    insert into E_EMP
```

TABLE 11-continued

```
49.    select empno, deptno, age, ts, msg
50.    from DT_EMP;
51.    insert into E_PROJ
52.    select projno, lead, ts, msg
53.    from DT_PROJ;
54.    delete from PROJ, DT_EMP
55.    where PROJ.lead = DT_EMP.empno;
56. end
```

SUMMARY OF THE INVENTION

The invention provides method and apparatus for use in a database management system for managing a database containing data, where the database has storage for storing data in the database, and has an instruction processor for processing instructions for managing data stored in the database. The database has a constraint manager for managing constraints on said data stored in the database. The invention provides efficient method and means for deferred checking of data after bulk loading into said database for violation of constraints by determining appropriate procedure for constraint checking by:

determining whether constraint checking is required, and if it is required; determining whether to implement full, or incremental checking for compliance with said constraints; and then checking the data in the database in accordance with the determined constraint checking procedure.

Software is provided for implementing the invention.

DETAILED DESCRIPTION OF A PREFERRED EMBODIMENT OF THE INVENTION

Figure 9A:
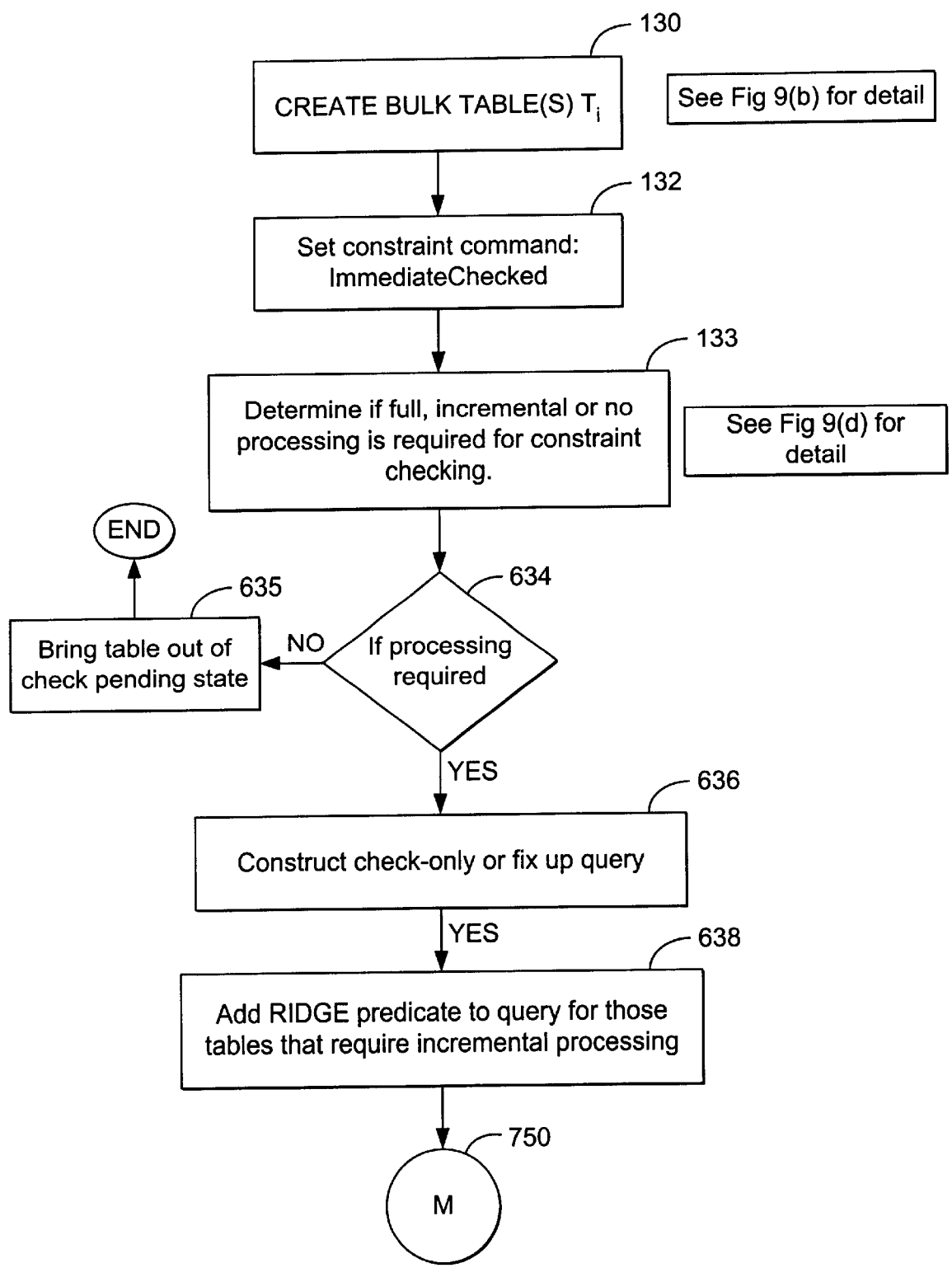
FIGS. 9(a) provide a flow chart illustrating the steps of employed in executing the present invention.

Referring to FIG. 9(a) which depicts a flow chart of a process in accordance with the invention for bulk loading of data into a table $T_i$ and checking it, the process is started by the bulk loading of one or more tables ($T_i$) in a mass storage 82 (of FIG. 3) as shown in step 130. The table $T_i$ will be placed in a pending state until constraints are checked.

Generally, a deferred constraint checking process checks the table for violating rows. A user can choose between check-only mode (i.e., error will be returned when the first violating row is found), or fix-up mode (i.e., removing all violating rows that violate any constraint defined on the table and moving these rows into another table called the Exception table). In either mode, if no error is returned, the table will be brought out of the Check Pending state.

Additional Terminology and Assumptions

In a parallel multi-node data processing system, a database management system operating in the data processing system can efficiently handle large amounts of data by partitioning the database into a number of database partitions and distributing the database partitioning across the nodes of the data processing system.

A table, in which data resides, defined in the database may also be divided into partitions, referred to as table partitions. Data in the table is distributed across the table partitions according to a partitioning map.

LOAD stores newly loaded data contiguously at the end of the table. In an Parallel multi-node system, load data is stored contiguously on each partition.

Two types of LOAD operations are contemplated:

Load Replace—newly loaded data replaces any existing data in a table

Load Insert—existing data is retained and newly loaded data are appended to the end of a table RID (Row ID)—each row in a table can be uniquely identified by a unique row ID, called the RID.

New Terminology

Check Pending Period: A table enters the check pending state as a result of a LOAD command. The SET CONSTRAINTS statement is used to bring the table out of the check pending state. The period from when the table enters the check pending state to when the table is taken out of check pending state is referred to as a Check Pending Period.

Processing Methods:

| | |
|---|---|
| Full Processing | all rows in the tables are checked for constraint violations. |
| Incremental Processing | only the delta portion (the newly appended data) are checked for constraint violations. |
| No Processing | row is checked for constraint violations. |

Full vs. Partial Table Scan

| | |
|---|---|
| Full Table Scan -- | A type of scan that reads all rows in a table from beginning to the end. |
| Partial Table Scan -- | A type of scan that reads the rows in a table starting from a given point to the end. |
| T = | Table T (where multiple tables may be involved, the $i^{th}$ table will be labelled $T_i$) |
| $T.partition_k$ = | $k^{th}$ partition of table T |
| $T.partition_k.LoadOpr$ = | most "expensive" Load Operation performed on the $k^{th}$ partition of T (LOADREPLACE, LOADINSERT, LOADNONE) in the current check pending period, where LOADREPLACE is more "expensive" than LOADINSERT, which is more "expensive" than LOADNONE. |
| $T.partition_k.startRID$ = | Row ID of the first row of the first Load Append operation performed on the kth partition (assuming no Load Replace has occurred) in the current check pending period |
| $T.partition_k.pageCount$ = | Number of pages that has been appended to the kth partition of table T. This is to be used by the Optimizer as statistics. |

Figure 9B:
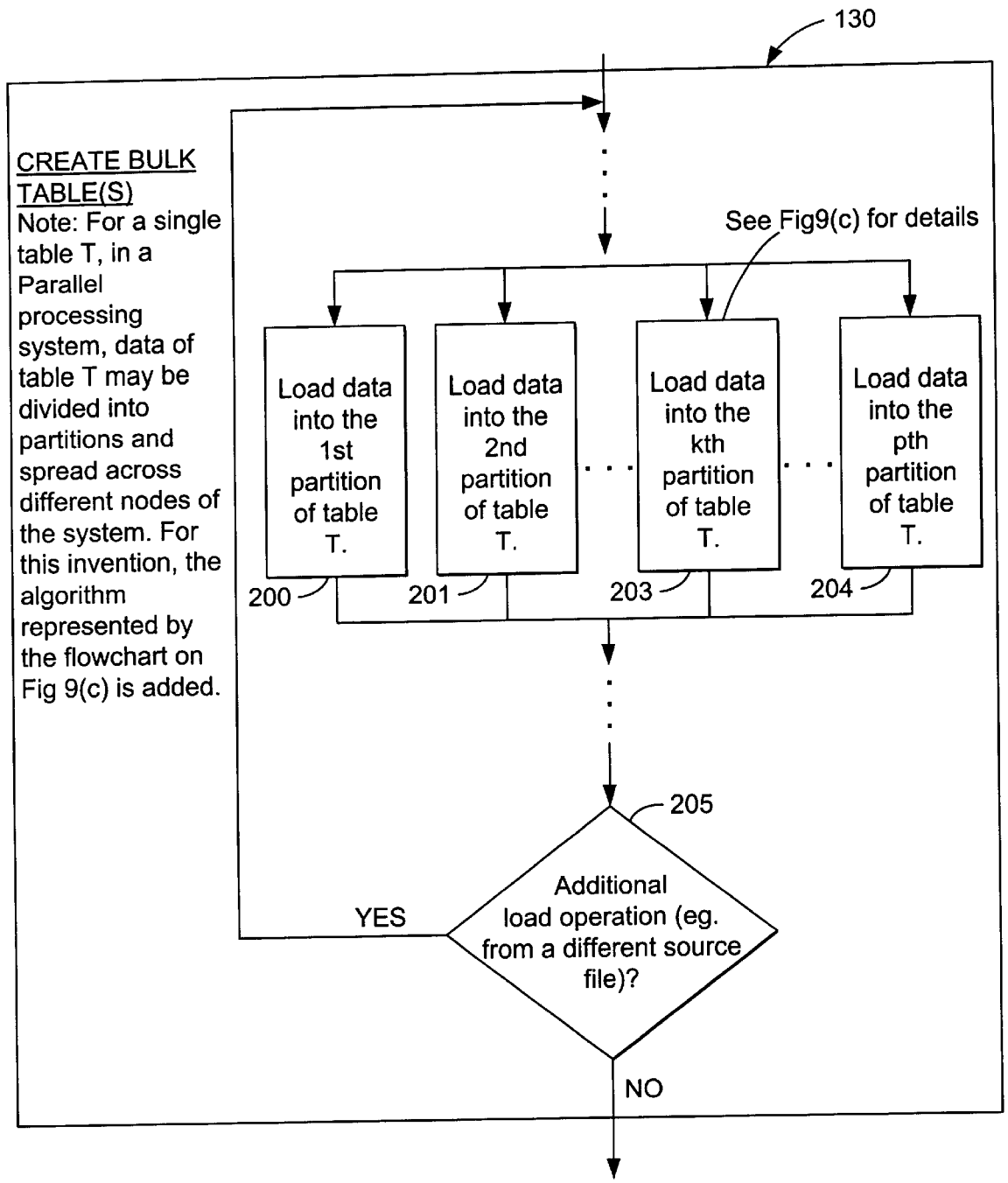
FIG. 9(b) elaborates the details of the portion of the invention illustrated in box 130 of FIG. 9(a).

Referring to FIG. 9(b), additional detail is provided for step 130 which describes bulk loading where a table, T, is distributed in multiple partitions.

Figure 11:
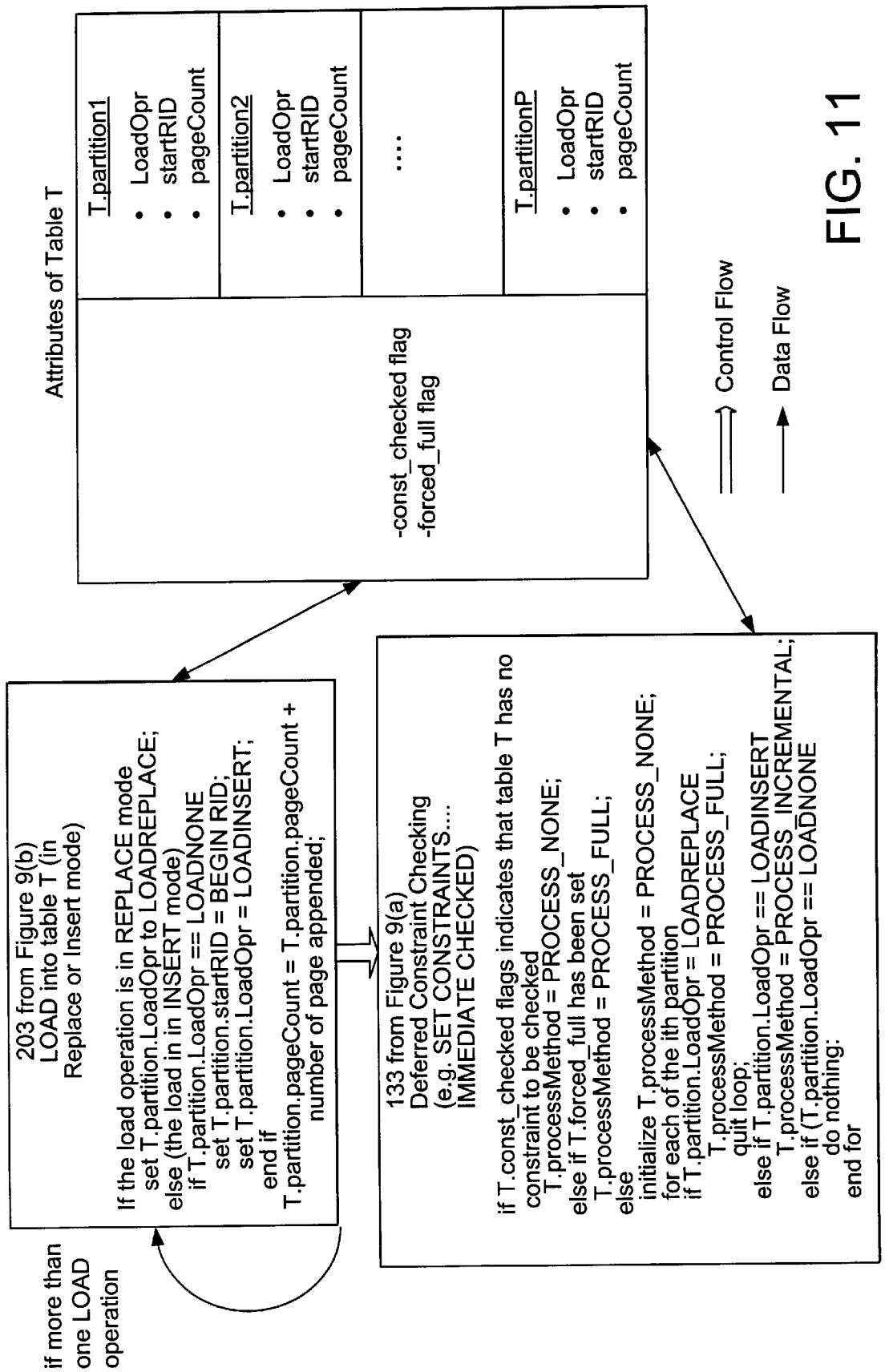
FIG. 11 provides a high level drawing of a generalized embodiment of the general process of the invention.

During the bulk load process data is divided up among table partitions (see FIG. 11) of the database system by the database management system according to its normal operating procedure which will be readily understood by those skilled in the art in database field.

For exemplary purposes, the loading of one partition, $partition_k$, 203, will be now described.

Figure 9C:
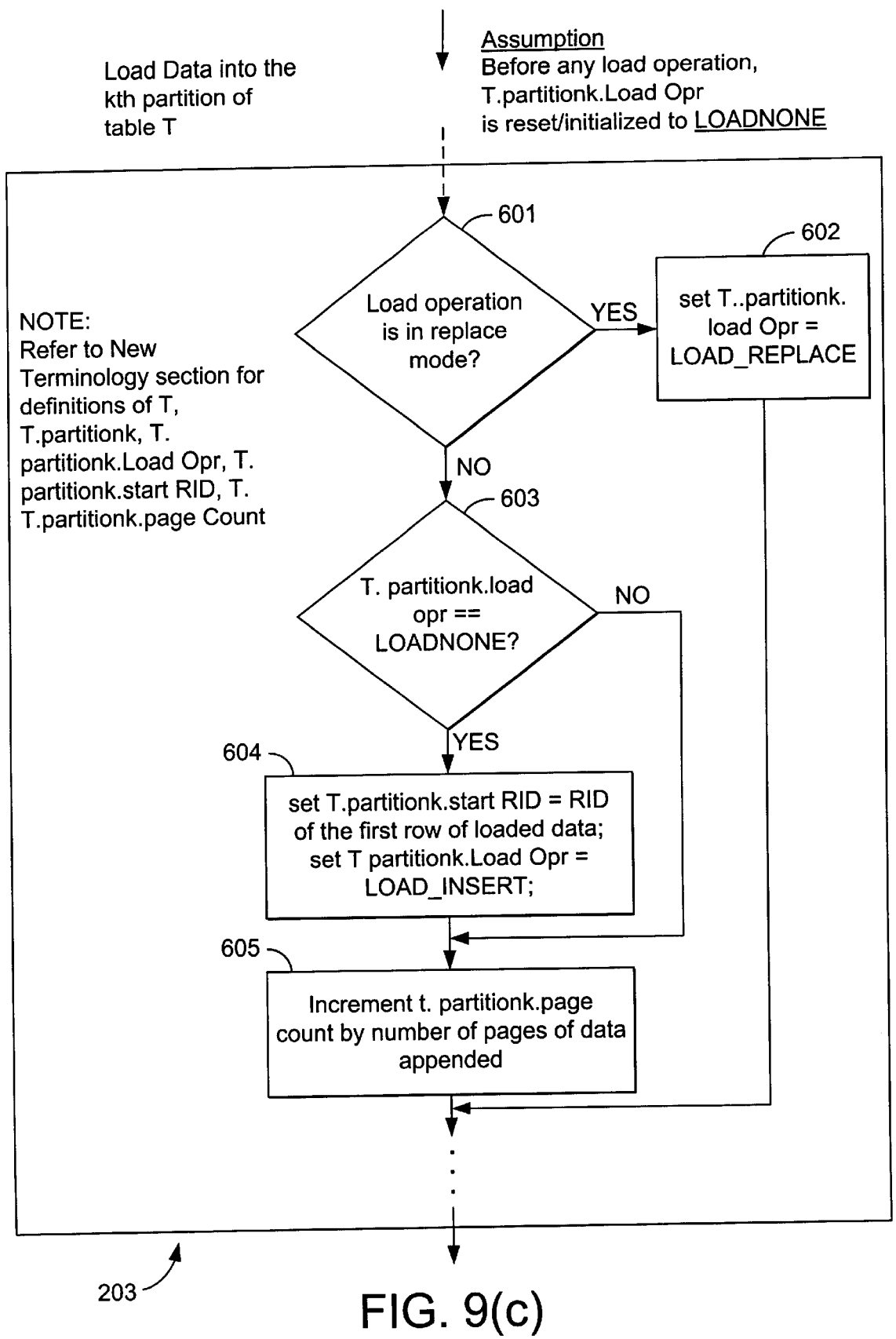
FIG. 9(c) illustrates an embodiment of the process used in the LOAD process of the invention.

Referring to FIG. 9(c) for this purpose, it can be seen that, instead of always checking all rows of a table in the check pending state for constraint violations, this invention enhances performance by keeping track of the operations that has been performed on the table and determining how much of the table needs to be checked for constraint violations.

The process of FIG. 9(c) is conveniently implemented in the pseudo-code that follows which is indexed to FIG. 9(c).

```
if the load operation is in REPLACE mode (601)
  set T.partition_k.LoadOpr to LOADREPLACE; (602)
else (the load is in INSERT mode)
  ifT.partition_k.LoadOpr == LOADNONE (i.e. the table partition
```

-continued

```
    has not been loaded before) (603)
        set T.partition_k.startRID = BEGIN RID; (604) (the RID of the
        first row of the append portion)
        set T.partition_k.LoadOpr = LOADINSERT; (604)
    end if
    T.partition_k.pageCount = T.partition_k.pageCount + number
    of page appended;
    (605)
```

Note:
1. During a LOAD operation, the attribute LoadOpr is updated on each loaded partition to record the most "expensive" type of Load operation within a check pending period. If LoadOpr is set to 'LOADINSERT', startRID may also be updated.
2. $T.partition_k.start$ RID is updated only for the *first* Load Append operation (i.e. only when the partition is loaded for the first time in the check pending period).
3. $T.partition_k.startRID$ and $T.partition_k.LoadOpr$ will be reset to 0 and LOADNONE respectively when table T is later brought out of the check pending state.

Computing the type of Processing Method Required

Referring to FIG. 9(a) again deferred constraint checking (step 132) is initiated by a user using, in the case of DB2™ UDB™ V5 for instance, the command "Set Constraints" with option "Immediate Checked".

Figure 9D:
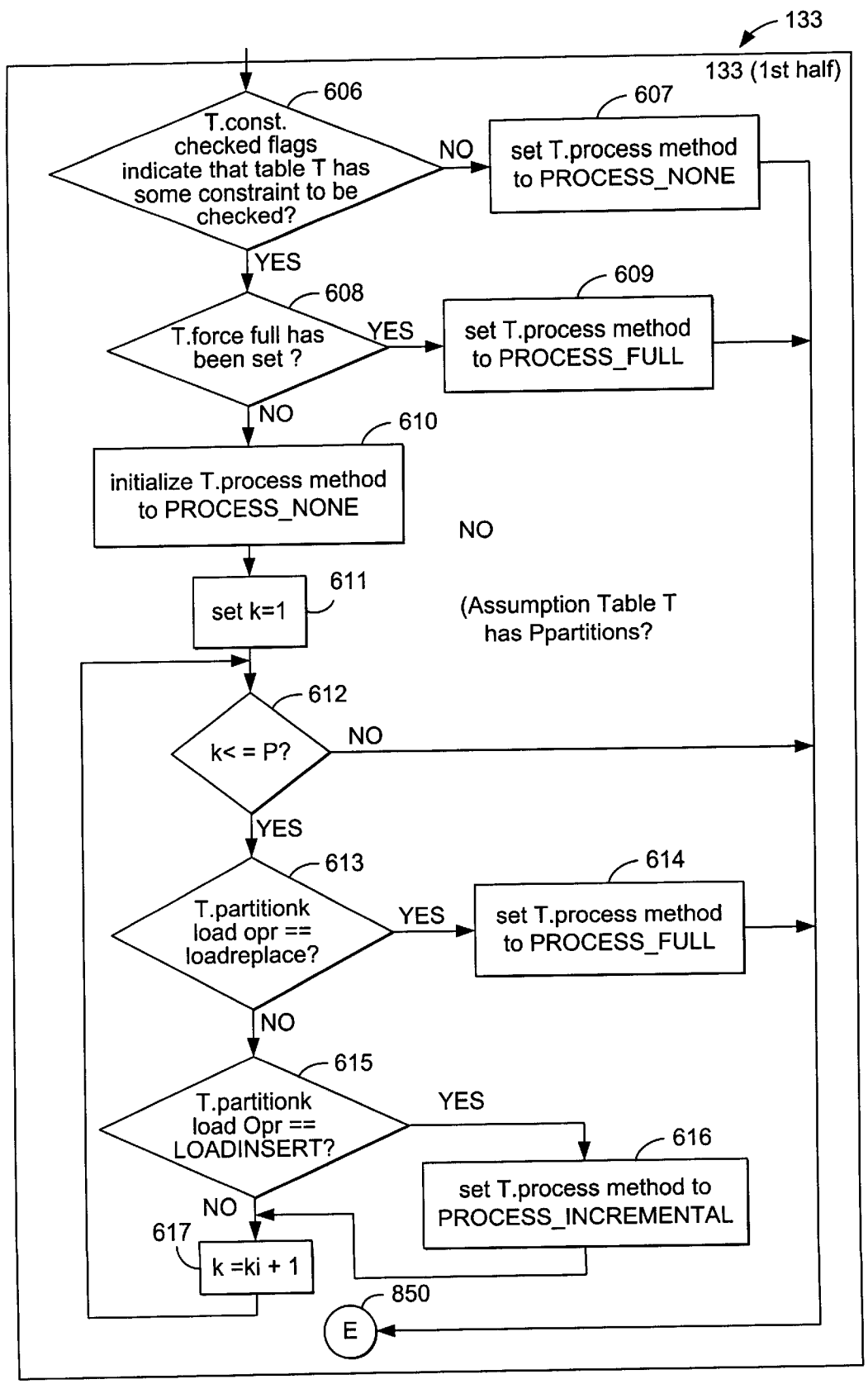
FIG. 9(d) elaborates the details of the portion of the process of the invention illustrated in the first half of box 133 in FIG. 9(a).
Figure 9E:
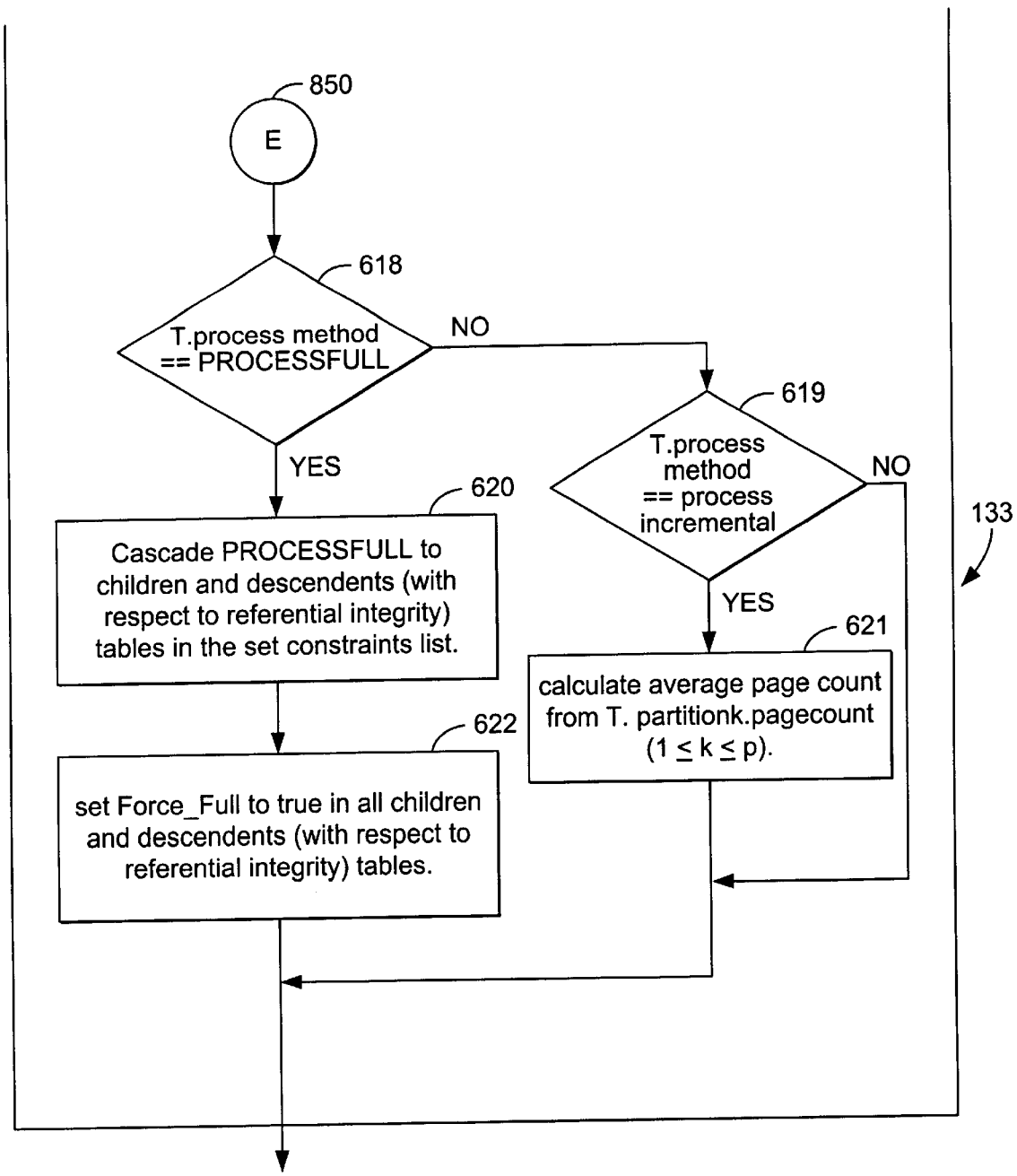
FIG. 9(e) elaborates on the second half of box 133 in FIG. 9(a).

Referring to step 133 in FIG. 9(a) as illustrated in greater detail in FIG. 9(d), and the pseudo-code which follows, the specific embodiment of the invention depicted determines if full, incremented, or no processing is required for constraint checking when the command "SET CONSTRAINTS FOR T IMMEDIATE CHECKED" is issued, the database management system determines the type of processing method (i.e. one of Full Processing, Incremental Processing or No Processing) required for constraint checking, performs constraint checkings, and brings table T out of the check pending state.

Algorithm (F) F(T.const checked, T.force full, $T.partition_k..LoadOpr)->T.processMethod$:

Input:

T.const_checked=flags in the catalog indicating whether a type of constraint (e.g. Foreign Key or Check) has been checked or not.

T.forced_full=forced_full flag of table T (TRUE or FALSE), a flag indicating if full processing on the table is mandatory.

$T.partition_k.LoadOpr$ (defined in New Terminology section) (the most expensive type of load operation recorded for the kth partition table T.)

Output:

T.processMethod: the type of processing method required on table T

Pseudo-code:

```
if T.const_checked flags indicates that table T has no constraint to be
checked (606)
    T.processMethod = PROCESS_NONE; (607)
else ifT.forced_full flag has been set (608)
    T.processMethod = PROCESS_FULL; (609)
else
    initialize T.processMethod = PROCESS_NONE; (610)
    for each of the k^th partition (steps 611, 612, 617)
        if T.partition_k.LoadOpr == LOADREPLACE (613)
            T.processMethod = PROCESS_FULL; (614)
            quit loop;
        else if T.partition_k.LoadOpr == LOADINSERT (615)
            T.processMethod = PROCESS_INCREMENTAL; (616)
```

-continued

```
    else T.partition_k.LoadOpr == LOADNONE)
        do nothing (leave T.processMethod unchanged)
    end for
```

Note:
(1) The input T.force_full of algorithm (F) is set in several cases:
If a constraint has been added to T or any of its ancestors while that table is in the Check Pending state.
a previous SET CONSTRAINTS statement employed full processing for some ancestors of T where the ancestors have a referential integrity relation to Table T. The forced_full flag will then be cascaded to all descendants of that ancestor.
(2) It is possible for the LOAD operation to load data into some partitions but not the others. The LoadOpr on each partition may record a different (most expensive) LoadOpr. The for-loop (steps 611 to 617) does the following:
if ANY partition has been load Replaced, FULL processing will be performed.
if ALL partitions record a LOADNONE, NO processing will be performed.
if there is at least one partition that has been Load Inserted and no partition has been Load Replaced, INCREMENTAL processing will be performed.

Referring to FIG. 9(d), if full processing is required (618), cascade full processing (620) to those descendent tables in the invocation list (list of tables specified in the same SET CONSTRAINTS statement), and mark a force_full (622) flag in those descendent tables that are not in the invocation list.

Referring to FIG. 9(d), if incremental processing is required (619), a special predicate called the RIDGE (RID Greater Than) predicate will be added to the QGM graph (which will be explained subsequently). This predicate reduces the set of rows that require constraint checking to only the newly appended rows. To assist in Optimizer decisions in order to keep track of the amount of data loaded an average Page Count can also be computed (621) from T.partitionk.pageCount.

Referring to FIG. 9(a), if no processing is required, the table will not be checked for constraint violation.

As may be seen the embodiment of the invention determines if full, incremental, or no processing is required for constraint checking.

If no processing (634) is required, then the table can be brought immediately out of the check pending state (635) without doing any checking.

If processing is required (634) a query (636) is constructed by the database management system to capture the following semantics:

(a) if a user has selected the check-only mode of constraint checking an error message will be returned when the first violating row that has been loaded in the table T has been detected; or (b) if fix-up mode has been selected by the user, all rows violating constraints defined on the table can be either removed or copied an exception table.

As stated before, if no error message is returned, the table T will brought out of Check Pending state. Check only and fix-up nodes are known in the database field (see U.S. Pat. No. 5,706,494).

Referring once again to the invention herein as described in FIG. 9(a), in step 638, after constructing the query, a RIDGE predicate is added to each table $T_i$ that requires incremental processing. The RIDGE predicate allows constraint checking only the appended rows to table $T_i$.

Figure 10:
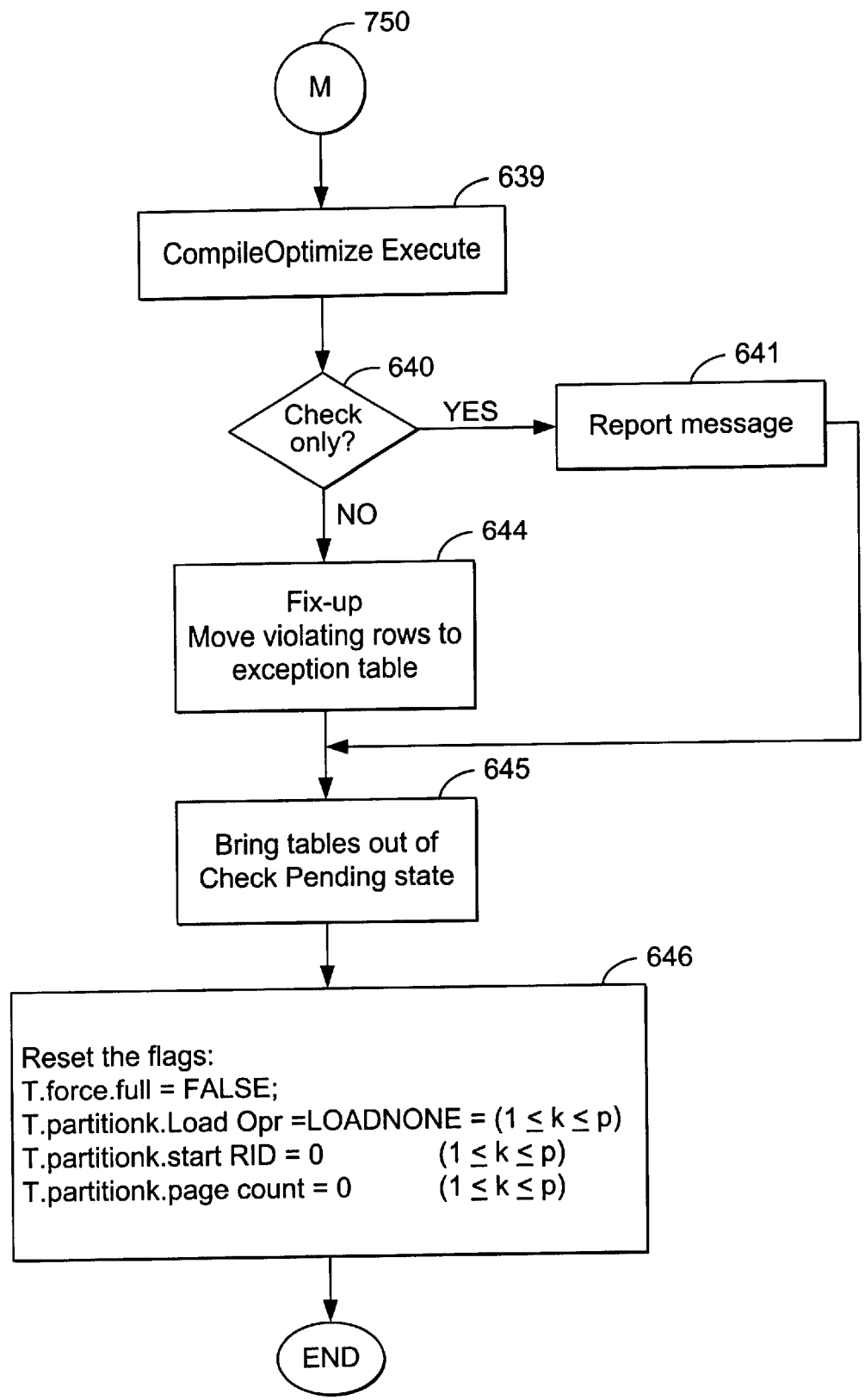
FIG. 10 is simply a continuation of the flow chart in FIG. 9(a).

Link M, numbered 750, serves as a visual link between FIGS. 9(a) and 10.

Tables 8(a) and 11(a) show the modifications to Tables 8 and 11 after adding the RIDGE predicate. A comparison of Table 8 and Table 8(a) indicates that the RIDGE predicates "EMP.#TID>=D01D2 (on line 4 of Table 8(a) and "PROJ. #TID.=D01D2 (on line 16 of Table 8(a) are added to the query. Referring to Table 11(a), similar predicates are added on line 19 and 36.

TABLE 8(a)

```
 1.  begin
 2.      select 1
 3.      from EMP
 4.      where EMP.#TID>=DOID2 and 1=case
 5.          when EMP.deptno is not null and
 6.              not exists
 7.                  (select 1 from DEPT.deptno
 8.                  where DEPT.deptno = EMP.deptno)
 9.              then raise-- error('-3603', EMPDEPT)
10.          when not EMP.age > 16)
11.              then raise-- error('-3603', MINAGE)
12.          else 2
13.      end
14.      select 1
15.      from PROJ
16.      where PROJ.#TID>=DOID2 and 1 = case
17.          when PROJ.lead is not null and
18.              not exists
19.                  (select 1 from EMP
20.                  where EMP.empno = PROJ.lead)
21.              then raise-- error('-3603', PROJLEAD)
22.          else 2
23.      end
24.  end
```

TABLE 11(a)

```
 1.  begin
 2.      create temporary table ONEROW(c_1) as (values (1))
 3.      create temporary table VIOL_EMP (rid, empno, deptno, age,
         ts, msg) as
 4.          (select EMP.#rid, EMP.empno, EMP.deptno, EMP.age,
             current timestamp,
 5.              case when TEMP_PEMPDEPT.x is not null and
 6.                  EMP.deptno is not null
 7.                  then 'EMPDEPT' else"
 8.              end ||
 9.              case when not (age > 16)
10.                  then 'MINAGE' else"
11.              end
12.          from EMP left outer join
13.              (select 1
14.              from ONEROW
15.          where
16.          not exists
17.              (select 1 from DEPT
18.                  where DEPT.deptno = EMP.deptno)) as
                   TEMP_EMPDEPT
19.          where EMP.#TID>=DOID2 and (TEMP_EMPDEPT.x is
             not null and
20.              EMP.deptno is not null)
21.          or
22.          not (age > 16))
23.      create temporary table VIOL_PROJ (rid, projno, lead, ts, msg) as
24.          (select PROJ.projno, PROJ.lead, current timestamp,
25.              case when TEMP_PROJLEAD.x is not null and
26.                  PROJ.lead is not null
27.              then 'PROJLEAD' else"
28.              end
29.          from PROJ left outer join
30.              (select 1
31.              from ONEROW
32.          where
33.              not exists
34.                  (select 1 from EMP
35.                  where EMP.empno = PROJ.lead)) as
                   TEMPPROJLEAD
36.          where PROJ..#TID>=DOID2 and TEMP_PROJLEAD.x is not
             null and
37.              PROJ.lead is not null)
```

TABLE 11(a)-continued

```
38.     select * from VIOL_EMP;
39.     select * from VIOL_PROJ;
40.     create temporary table DT_EMP (empno, deptno, age, ts, msg) as
41.         (delete VIOL_EMP.empno, VIOL_EMP.deptno, VIOL_EMP.age,
            VIOL_EMP.ts, VIOL_CMP.msg
42.             from EMP, VIOL_EMP
43.             where EMP.#rid = VIOL_EMP.rid);
44.     create temporary table DT_PROJ (projno, lead, ts, msg) as
45.         (delete VIOL_PROJ.projno, VIOL_PROJ.lead, VIOL_PROJ.ts,
            VIOL_PROJ.msg
46.             from PROJ, VIOL_PROJ
47.             where PROJ.#rid = VIOL_PROJ.rid);
48.     insert into E_EMP
49.     select empno, deptno, age, ts, msg
50.     from DT_EMP;
51.     insert into E_PROJ
52.     select projno, lead, ts, msg
53.     from DT_PROJ;
54.     delete from PROJ, DT_EMP
55.     where PROJ.lead = DT_EMP.empno;
56. end
```

How the RIDGE Predicated is Used by the Optimizer and at Query Execution Time

The RIDGE (RID Greater Than) predicate is of the form: RID>=star-RID, where RID is the row ID of the row being processed at execution time, startRID is the RID recorded in the LOAD phase. In the case of parallel multi-node systems, the predicate will be translated to the form RID>= T.partition$_k$.startRID when executed on the $k^{th}$ partition.

The RIDGE predicate, like other predicate performs a filtering functions, and filters out those rows not in the appended portion by "comparing" the RID of the row being processed with T.startRID with the help of a mapping function (this technique is well known in the art and needs no explanation) between RID and the physical location of a row). This could be done through a partial table scan by scanning (i.e. retrieving rows from) table T starting from the row with row id T.startRID.

Unlike other predicates, the RIDGE predicate can be marked as optional, especially for constraint checkings. Since constraint checking is idempotent (i.e., the same rows can be checked for constraint violations more than once), the RIDGE predicate can be marked as optional. It gives the Optimizer more flexibility if an alternative plan, which involves reading and checking rows not in the appended portion, is found to be cheaper than the partial table scan method. For example, if a column having a highly selective index is part of the constraints, it may be cheaper to use a full index scan instead of the partial table scan. In this case, the application of the RIDGE predicate is optional.

Referring to FIG. 10, the Query formed above can be compiled, optimized and executed (639) is well known in the art.

If check only mode is enabled (640) then only the first violating row, found in Table T$_i$, if any, will cause error message (641) to be generated and returned to the user, however, if in fix-up node then violating rows will be moved (644) into an exception table.

The table T$_i$ will then be brought out of Check Pending (645) and the flags indicated in step 646 will be reset.

This completes checking the tables in accordance with one embodiment of the invention. Examples of some embodiments of the invention and their advantages are described below:

EXAMPLE 1

INCREMENTAL PROCESSING: when a table has been appended data using the Insert option of the Load command, except for a few special cases, only the appended portion needs to be checked for constraint violations. Performance will be greatly enhanced if the table size is huge while the appended portion is small.

Example:
```
load from datafile.del of del insert into T;
    //The Load command appends some rows into
    //T and puts it into the check
    //pending state.
set constraints for T immediate checked;
    //The system determines that only the
    //appended portion needs to be checked for
    //constraints violation.
```

EXAMPLE 2

NO PROCESSING: when a table has been put into the check pending state without introducing possible constraint violations (using the command SET CONSTRAINTS with OFF option), no row needs to be checked for constraint violations. This avoids unnecessary constraints processing.
```
set constraints for T off;
    //T is put into the check pending state
set constraints for T immediate checked;
    //System determines that no row needs
    //to be checked for constraint violations.
```

EXAMPLE 3

FULL PROCESSING: when new constraints have been added to a table while it is in the check pending state, existing rows may violate the new constraints. The whole table will be checked for constraint violations.
```
set constraints for T off;
    //T is put into the check pending state
alter table T add constraint CHK1 check (c1>0);
    //New constraint added to table
set constraints for T immediate checked;
    //System determines that new constraint
    //has been added. The whole table will
    //be checked for constraint violations.
```

EXAMPLE 4

FULL PROCESSING: when the parent of a child was fully processed (i.e. all rows in the parent table were checked for constraint violations), violating rows (if any) were moved to the exception table. Since these violating rows may be the foreign key of its children tables, all children of the parent table need to be fully processed to ensure referential integrity of data.
```
load from datafile.del of del replace into T_parent;
    //T_parent has been load replaced.
    //Both T_parent and it child T_child
    //are put into the check pending state.
set constraints for T_parent immediate checked;
    //T_parent is fully processed.
set constraints for T_child immediate checked;
    is //Full processing is cascaded from its
    //parents. All rows in T_child are
    //checked for constraint violations.
```

EXAMPLE 5

FULL PROCESSING: when a table has been loaded data using the REPLACE option. Existing rows will be deleted and replaced with new rows. The entire table will be checked for constraint violations.

load from datafile.del of del replace int T; //Load in Replace mode
set constraints for T immediate checked; //System determines that
//entire table needs to
//be checked for constraint
//violations The following examples illustrate the invention applicable to a variety of bulk loading scenarios:

The scenarios (No, Full or Incremental processing) described above are the simple scenarios that only a single LOAD operation is performed. The method of the invention is capable of determining the type of processing method after one or more LOAD operations (in a combination of either RFPLACE or INSERT mode).

EXAMPLE 6

Load Append to table T from source1
Load Append to table T from source2
Load Append to table T from source3
Deferred constraint checking on table T will check constraints for the appended rows from source1, source2 and source3.

EXAMPLE 7

Load Append to table T from source1
Load Replace to table T from Source2
Load Append to table T from source3
Deferred constraint checking on table T will check the whole table (i.e. rows loaded from source2 and source3).
  [Note: rows from source1 were replaced by the second Load operation which was performed in Replace mode.]

Note that the SET CONSTRAINTS command examples (all 7 examples) above are in check-only mode. A similar approach applies to the scenarios in which user specifies fix-up mode, just that exception tables need to be defined and specified in SET CONSTRAINTS command. The main focus of the examples is to demonstrate how much of the table needs to be checked for constraint violations (the entire table, only the appended portion, or no check is needed).

The following examples indicate performance improvements of the invention over the prior art U.S. Pat. No. 5,706,494 in two scenarios:

Scenario 1:
  a table T has a few check constraints and a Referential Integrity constraint
  10M of data is loaded (appended) into the table every week
  the table contains 1,040M of data, over a 2 year period, (i.e. 2 years×52 weeks/year×10M/week=1,040M of data)
If 1 more week of data (10M) is appended to the table:
  before this invention, the whole table, 1050M of data, would be checked for constraint violation, (i.e., 1,040M+10M=1,050M of data).
  with this invention, only the appended portion, i.e., 10M of data, will be checked for constraint violation. The number of rows that needs to be checked is about 1/100th of what needs to be checked before.
Note: M represents a million records, G represents a billion records.

Scenario 2:
  a table T has a few check constraints and a Referential Integrity constraint
  1G of data is loaded (appended) into the table every month
  the table contains 24G data over a 2 year period, (i.e. 2 years×12 months/year×1 G/week=24G of data)
If 1 more month of data (1G) is appended to the table:
  before this invention, the whole table 0.25G of data will be checked for constraint violation. (i.e. 25 G (24G+1G of data).
  with this invention, only the appended portion, i.e., 1G of data, will be checked for constraint violation. Number of rows that needs to be checked is about 1/25th of what needs to be checked before.

While this invention is primarily discussed as a method, it can be understood by a person of ordinary skill in the art that the apparatus discussed above in connection with FIG. 3 may be programmed or otherwise designated to facilitate the practice of the method of this invention. Also, an article of manufacture, such as the prerecorded floppy disk or other similar computer program product, for use with a data processing systems, could include a storage medium and program means recorded thereon for directing the data processing system to facilitate the practice of the method of this invention. It will be understood that such apparatus and articles of manufacture also fall within the spirit and scope of this invention.

Other embodiments and modification of this invention may occur to those ordinary skill in the art in view of these teachings. Therefore, this invention is limited only by the following claims, which include all such embodiments and modifications when viewed in conjunction with the above specifications and accompanying drawings.

The embodiments of the invention in which an exclusive property or privilege is claimed are defined as follows:

1. In a database management system for managing a database containing data comprising:
  storage for storing data in said database;
  an instruction processor for processing instructions for managing data stored in said database;
  a constraint manager for managing constraints on said data stored in said database;
  a method for deferred checking of data after bulk loading into said database for violation of at least one constraint comprising:
    determining an appropriate procedure for constraint checking comprising:
      determining whether constraint checking is required; and if it is required, determining whether to implement full, or incremental checking for compliance with said at least one constraint; and
      checking said data in accordance with said determined constraint checking procedure.

2. The method of claim 1 wherein said method for deferred checking of data after bulk loading into said database is adapted to check for violation of at least one constraint, said method comprising:
  placing said database in a check pending state before checking;
  determining an appropriate procedure for constraint checking as claimed in claim 1, checking said data in accordance with said determined constraint checking procedure, bringing said database out of said cheek pending state after checking said data.

3. An article of manufacture for use in a computer system comprising a computer readable medium for storing statements or instructions for use in execution in a computer in accordance with the method of claim 1.

4. In a relational database management system for managing a database containing data comprising:

memory storage for storing at least one table having a plurality of data records;

each of said data records being uniquely identifiable; an instruction processor for processing instructions for managing said data records in said database;

a constraint manager for managing constraints, including table constraints and referential integrity constraints, on said data records in said database;

a method for deferred checking of data in a table after bulk loading into said database for violation of said constraints comprising:

placing said table into a check pending state before checking;

determining an appropriate procedure for constraint checking comprising:

determining whether constraint checking is required; and if it is required, determining whether to implement full, or incremental checking for compliance with said constraints;

wherein said full checking comprises checking all data in a table including any preexisting data and bulk loaded data;

and wherein incremental checking comprises checking only that data in a table which was appended to said table in bulk loading;

checking said table in accordance with said determined constraint checking procedure; and bringing said table out of check pending state when constraint checking determines that no violation is present.

5. The method of claim 4 for deferred checking of data in a table after bulk loading into said database further comprising:

(a) recording load operation information (Load.Opr) including, whether bulk loaded data was appended to said table, or whether all data in said table, including data previously present in said table and new data, was replaced by bulk data; and, (b) setting selected constraint flags of said database management system;

said selected constraint flags being set when constraints require checking and are not set when constraints have either previously been checked or otherwise do not require checking;

wherein said determining of said appropriate procedure for constraint checking for a table includes using the following information:

said recorded load operation information and whether said selected constraint flags of said database management system are set.

6. The method of claim 5 wherein said selected constraint flags comprise:

at least one of a referential integrity constraint (foreign key) flag, a table check constraint flag, and a forced full constraint checking flag is set for said table.

7. The method of claim 6 wherein, in the process of a sequential series of bulk data load operations on a table, checking is deferred until all loading of data has occurred, wherein said recorded load operation information on a table is set to the most expensive load operation of said series of bulk data load operations performed on said table.

8. The method of claim 6 for deferred constraint checking of a table implemented in table partitions across a database, comprising:

detecting if any flag indicates that a type of constraint has not already been checked is set, and if set checking said table for violation of said constraint;

detecting if a forced full flag is set, and if set checking all data records of said table for constraint violations;

detecting if data records in any table partition have been replaced, and if so checking all data records of said table for constraint violations; and detecting if any data has been inserted into a table partition without the replacement of data in any table partitions, and if so inserted without replacement checking for constraint violation by incremental checking.

9. The method of claim 8 comprising:

checking whether any data was loaded in bulk loading, and if no data was loaded then preventing constraint checking.

10. The method of claim 6 wherein said instruction processor comprises a query processor for processing queries.

11. The method of claim 10 wherein said instruction processor comprises a query compiler for compiling queries and a query processor for processing queries in said database.

12. The method of claim 5 for deferred constraint checking of a table implemented in table partitions across a database, comprising:

detecting if any flag indicates that a type of constraint has not already been checked is set, and if set checking said table for violation of said constraint;

detecting if a forced full flag is set, and if set checking all data records of said table for constraint violations;

detecting if data records in any table partition have been replaced, and if so checking all data records of said table for constraint violations; and detecting if any data has been inserted into a table partition without the replacement of data in any table partitions, and if so inserted without replacement checking for constraint violation by incremental checking.

13. The method of claim 12 comprising:

checking whether any data was loaded in bulk loading, and if no data was loaded then preventing constraint checking.

14. The method of claim 12 wherein a plurality of tables require checking, namely a parent table and at least one descendent table;

wherein if full constraint checking procedure is chosen for checking a parent table using a set constraint checking command listing parent and descendent tables said method comprises:

selecting full constraint checking procedure for said parent and descendent tables listed in said set constraint command, and for any descendent tables not listed in said set constraint command, marking a force-full flag to indicate that full processing will be required subsequently for said descendent tables in order to complete constraint checking before bringing said descendent tables out of check pending state.

15. An article of manufacture for use in a computer system comprising a computer readable medium for storing statements or instructions for use in execution in a computer in accordance with the method of claim 12.

16. An article of manufacture for use in a computer system comprising a computer readable medium for storing statements or instructions for use in execution in a computer in accordance with the method of claim 5.

17. The method of claim 5 wherein newly loaded data is stored contiguously in a table during bulk loading and wherein each data record of said data is uniquely identified with a record identifier (RID), a starting RID being assigned to the first record of data bulk loaded.

18. The method of claim 17 wherein for newly loaded data, in the case of append mode loading being used, comprising:
storing only the starting RID of said appended portion of said data on said table,
said newly loaded data being appended to the end of previously stored data in said table.

19. The method of claim 5 wherein said database comprises a relational database having a plurality of nodes; wherein a table in said database is partitioned into partitions in said database, newly loaded data is stored contiguously in a table partition wherein during bulk loading, in the case of appended inserted mode loading being used, storing only the starting RID of said appended portion of said data on said table partition, said newly loaded data being appended to the end of previously stored data in said table partition.

20. The method of claim 5 wherein said instruction processor comprises a query processor for processing queries.

21. The method of claim 20 wherein said instruction processor comprises a query compiler for compiling queries and a query processor for processing queries in said database.

22. An article of manufacture for use in a computer system comprising a computer readable medium for storing statements or instructions for use in execution in a computer in accordance with the method of claim 5.

23. The method of claim 4 wherein newly loaded data is stored contiguously in a table during bulk loading and wherein each data record of said data is uniquely identified with a record identifier (RID), a starting RID being assigned to the first record of data bulk loaded.

24. The method of claim 23 wherein for newly loaded data, in the case of append mode loading being used, comprising:
storing only the starting RID of said appended portion of said data on said table;
said newly loaded data being appended to the end of previously stored data in said table.

25. The method of claim 4 wherein said database comprises a relational database having a plurality of nodes; wherein a table in said database is partitioned into partitions in said database, newly loaded data is stored contiguously in a table partition wherein during bulk loading, in the case of appended inserted mode loading being used, storing only the starting RID of said appended portion of said data on said table partition, said newly loaded data being appended to the end of previously stored data in said table partition.

26. The method of claim 25 if incremental checking procedure is selected for constraint checking applying a RIDGE filter to select only newly appended data for checking.

27. The method of claim 26 wherein said instruction processor of said database management system includes an instruction optimizer comprising:
setting said RIDGE filter as optional in said database management system, using instruction optimizer to select an optimum processing procedure for accessing desired data records of said table to be checked for constraint violation.

28. The article of manufacture of claim 26 wherein said instruction processor comprises a query processor for processing queries.

29. The article of manufacture of claim 28 wherein said instruction processor comprises a query compiler for compiling queries and a query processor for processing queries in said database.

30. The method of claim 27 comprising:
recording the amount of data such as a page count of data loaded;
using said recorded amount by said query optimizer in decision making to determine an optimum processing procedure for checking constraint violation.

31. The article of manufacture of claim 30 wherein said instruction processor comprises a query processor for processing queries.

32. The article of manufacture of claim 31 wherein said instruction processor comprises a query compiler for compiling queries and a query processor for processing queries in said database.

33. The article of manufacture of claim 27 wherein said instruction processor comprises a query processor for processing queries.

34. The article of manufacture of claim 33 wherein said instruction processor comprises a query compiler for compiling queries and a query processor for processing queries in said database.

35. The method of claim 4 wherein said instruction processor comprises a query processor for processing queries.

36. The method of claim 35 wherein said instruction processor comprises a query compiler for compiling queries and a query processor for processing queries in said database.

37. An article of manufacture for use in a computer system comprising a computer readable medium for storing statements or instructions for use in execution in a computer in accordance with the method of claim 4.

38. An article of manufacture for use in a computer system in a database management system for managing a database containing data having:
storage for storing data in said database;
an instruction processor for processing instructions for managing data stored in said database;
a constraint manager for managing constraints on said data stored in said database;
said article of manufacture comprising a computer usable medium having computer readable program code routines embodied in said medium including:
a program code routines embodied in said computer usable medium for causing the computer to effect deferred checking of data after bulk loading into said database for violation of at least one constraint comprising:
determining an appropriate procedure for constraint checking comprising:
determining whether constraint checking is required; and if it is required, determining whether to implement full, or incremental checking for compliance with said at least one constraint; and
checking said data in accordance with said determined constraint checking procedure.

39. The article of claim 38 wherein said program code routines embodied in said computer usable medium for causing the computer to effect deferred checking of data after bulk loading into said database are adapted to check for violation of at least one constraint, comprising routines for:

placing said database in a check pending state before checking;

determining an appropriate procedure for constraint checking as claimed in claim 1, checking said data in accordance with said determined constraint checking procedure, bringing said database out of said check pending state after checking said data.

40. For a relational database management system in a computer system for managing a database containing data having:

memory storage for storing at least one table having a plurality of data records;

each of said data records being uniquely identifiable;

an instruction processor for processing instructions for managing said data records in said database;

a constraint manager for managing constraints, including table constraints and referential integrity constraints, on said data records in said database;

an article of manufacture comprising a computer usable medium having computer readable program code means embodied in said medium including program code routines embodied in said compute usable medium for causing the computer to effect deferred checking of data in a table after bulk loading into said database for violation of said constraints, comprising routines for:

placing said table into a check pending state before checking;

determining an appropriate procedure for constraint checking comprising:

determining whether constraint checking is required; and if it is required, determining whether to implement full, or incremental checking for compliance with said constraints;

wherein said full checking comprises checking all data in a table including any preexisting data and bulk loaded data;

and wherein incremental checking comprises checking only that data in a table which was appended to said table in bulk loading;

checking said table in accordance with said determined constraint checking procedure; and after checking said table, bringing said table out of said check pending state into a normal state if no constraint violation is found.

41. The article of manufacture of claim 40 for deferred checking of data in a table after bulk loading into said database further comprising program code routines for:

(a) recording load operation information (Load.Opr) including, whether bulk loaded data was appended to said table, or whether all data in said table, including data previously present in said table and new data, was replaced by bulk data; and, (b) setting selected constraint flags of said database management system;

said selected constraint flags being set when constraints require checking and are not set when constraints have either previously been checked or otherwise do not require checking;

wherein said determining of said appropriate procedure for constraint checking for a table includes using the following information:

said recorded load operation information and whether said selected constraint flags of said database management system are set.

42. The article of manufacture of claim 41 wherein said selected constraint flags comprise:

at least one of a referential integrity constraint (foreign key) flag, a table check constraint flag, and a forced full constraint checking flag is set for said table.

43. The article of manufacture of claim 42 wherein, in the process of a sequential series of bulk data load operations on a table, said computer program code routines are adapted so that checking is deferred until all loading of data has occurred, wherein said recorded load operation information on a table is set to the most expensive load operation of said series of bulk data load operations performed on said table.

44. The article of manufacture of claim 42 for deferred constraint checking of a table implemented in table partitions across a database, comprising computer program code routines for:

detecting if any flag indicates that a type of constraint has not already been checked is set, and if set checking said table for violation of said constraint;

detecting if a forced full flag is set, and if set checking all data records of said table for constraint violations;

detecting if data records in any table partition have been replaced, and if so checking all data records of said table for constraint violations; and detecting if any data has been inserted into a table partition without the replacement of data in any table partitions, and if so inserted without replacement checking for constraint violation by incremental checking.

45. The article of manufacture of claim 44 comprising computer program code routines for:

checking whether any data was loaded in bulk loading, and if no data was loaded then preventing constraint checking.

46. The article of manufacture of claim 42 wherein a plurality of tables require checking, namely a parent table and at least one descendent table comprising computer program code routines for:

if full constraint checking, procedure is chosen for checking a parent table using a set constraint checking command listing parent and descendent tables said method comprises:

selecting full constraint checking procedure for said parent and descendent tables listed in said set constraint command, and for any descendent tables not listed in said set constraint command, marking a force-full flag to indicate that full processing will be required subsequently for said descendent tables in order to complete constraint checking before bringing said descendent tables out of check pending state.

47. The article of manufacture of claim 41 for deferred constraint checking of a table implemented in table partitions across a database, comprising computer program code routines for:

detecting if any flag indicates that a type of constraint has not already been checked is set, and if set checking said table for violation of said constraint;

detecting if a forced full flag is set, and if set checking all data records of said table for constraint violations;

detecting if data records in any table partition have been replaced, and if so checking all data records of said table for constraint violations; and detecting if any data has been inserted into a table partition without the replacement of data in any table partitions, and if so inserted without replacement checking for constraint violation by incremental checking.

48. The article of manufacture of claim 47 comprising computer program code routines for:

checking whether any data was loaded in bulk loading, and if no data was loaded then preventing constraint checking.

49. The article of manufacture of claim 41 wherein a plurality of tables require checking, namely a parent table and at least one descendent table comprising computer program code routines for:

if full constraint checking, procedure is chosen for checking a parent table using a set constraint checking command listing parent and descendent tables said method comprises:

selecting full constraint checking procedure for said parent and descendent tables listed in said set constraint command, and for any descendent tables not listed in said set constraint command, marking a force-full flag to indicate that full processing will be required subsequently for said descendent tables in order to complete constraint checking before bringing said descendent tables out of check pending state.

50. The article of manufacture of claim 41 wherein said computer program code routines are adapted to store newly loaded data contiguously in a table during bulk loading and wherein each data record of said data is uniquely identified with a record identifier (RID), a starting RID being assigned to the first record of data bulk loaded.

51. The article of manufacture of claim 50 wherein for newly loaded data, in the case of append mode loading being used, comprising computer program code routines for:

storing only the starting RID of said appended portion of said data on said table;

said newly loaded data being appended to the end of previously stored data in said table.

52. The article of manufacture of claim 41 wherein said database comprises a relational database having a plurality of nodes; wherein a table in said database is partitioned into partitions in said database, newly loaded data is stored contiguously in a table partition wherein said computer program code routines are adapted so that during bulk loading, in the case of appended inserted mode loading being used, storing only the starting RID of said appended portion of said data on said table partition, said newly loaded data being appended to the end of previously stored data in said table partition.

53. The article of manufacture of claim 52 if incremental checking procedure is selected for constraint checking said computer program code routines are adapted for applying a RIDGE filter to select only newly appended data for checking.

54. The article of manufacture of claim 53 wherein said instruction processor of said database management system includes an instruction optimizer comprising:

setting said RIDGE filter as optional in said database management system, and said computer program code routines are adapted to use said instruction optimizer to select an optimum processing procedure for accessing desired data records of said table to be checked for constraint violation.

55. The article of manufacture of claim 54 comprising computer program code routines for:

recording the amount of data such as a page count of data loaded;

using said recorded amount by said query optimizer in decision making to determine an optimum processing procedure for checking constraint violation.

56. The article of manufacture of claim 52 wherein a plurality of tables require checking, namely a parent table and at least one descendent table comprising computer program code routines for:

if full constraint checking, procedure is chosen for checking a parent table using a set constraint checking command listing parent and descendent tables said method comprises:

selecting full constraint checking procedure for said parent and descendent tables listed in said set constraint command, and for any descendent tables not listed in said set constraint command, marking a force-full flag to indicate that full processing will be required subsequently for said descendent tables in order to complete constraint checking before bringing said descendent tables out of check pending state.

57. The article of manufacture of claim 40 wherein said computer program code routines are adapted to store newly loaded data contiguously in a table during bulk loading and wherein each data record of said data is uniquely identified with a record identifier (RID), a starting RID being assigned to the first record of data bulk loaded.

58. The article of manufacture of claim 57 wherein for newly loaded data, in the case of append mode loading being used, comprising computer program code routines for:

storing only the starting RID of said appended portion of said data on said table;

said newly loaded data being appended to the end of previously stored data in said table.

59. The article of manufacture of claim 40 wherein said database comprises a relational database having a plurality of nodes; wherein a table in said database is partitioned into partitions in said database, newly loaded data is stored contiguously in a table partition wherein said computer program code routines are adapted so that during bulk loading, in the case of appended inserted mode loading being used, storing only the starting RID of said appended portion of said data on said table partition, said newly loaded data being appended to the end of previously stored data in said table partition.

60. The article of manufacture of claim 59 if incremental checking procedure is selected for constraint checking said computer program code routines are adapted for applying a RIDGE filter to select only newly appended data for checking.

61. The article of manufacture of claim 60 wherein said instruction processor of said database management system includes an instruction optimizer comprising:

setting said RIDGE filter as optional in said database management system, and said computer program code routines are adapted to use said instruction optimizer to select an optimum processing procedure for accessing desired data records of said table to be checked for constraint violation.

62. The article of manufacture of claim 61 comprising computer program code routines for:

recording the amount of data such as a page count of data loaded;

using said recorded amount by said query optimizer in decision making to determine an optimum processing procedure for checking constraint violation.

63. The article of manufacture of claim 59 wherein a plurality of tables require checking, namely a parent table and at least one descendent table comprising computer program code routines for:

if full constraint checking, procedure is chosen for checking a parent table using a set constraint checking command listing parent and descendent tables said method comprises:

selecting full constraint checking procedure for said parent and descendent tables listed in said set constraint command, and for any descendent tables not listed in said set constraint command, marking a force-full flag to indicate that full processing will be required subsequently for said descendent tables in order to complete constraint checking before bringing said descendent tables out of check pending state.

* * * * *

UNITED STATES PATENT AND TRADEMARK OFFICE
CERTIFICATE OF CORRECTION

PATENT NO. : 6,453,314 B1  Page 1 of 1
APPLICATION NO. : 09/364753
DATED : September 17, 2002
INVENTOR(S) : Petrus Kai Chung Chan et al.

It is certified that error appears in the above-identified patent and that said Letters Patent is hereby corrected as shown below:

Column 24, line 4, claim 28, "article of manufacture" should read --method--.

Column 24, line 7, claim 29, "article of manufa ture" should read --method--.

Column 24, line 17, claim 31, "article of manufacture" should read --method--.

Column 24, line 20, claim 32, "article of manufacture" should read --method--.

Column 24, line 24, claim 33, "article of manufacture" should read --method--.

Column 24, line 27, claim 34, "article of manufacture" should read --method--.

Signed and Sealed this

Twenty-sixth Day of February, 2008

JON W. DUDAS
*Director of the United States Patent and Trademark Office*